US 10,857,880 B2

(12) United States Patent
Matsushita

(10) Patent No.: US 10,857,880 B2
(45) Date of Patent: Dec. 8, 2020

(54) VEHICLE

(71) Applicant: YAMAHA HATSUDOKI KABUSHIKI KAISHA, Iwata (JP)

(72) Inventor: Yasushi Matsushita, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 128 days.

(21) Appl. No.: 16/377,330

(22) Filed: Apr. 8, 2019

(65) Prior Publication Data

US 2019/0337384 A1 Nov. 7, 2019

(30) Foreign Application Priority Data

May 1, 2018 (JP) ................................ 2018-088342

(51) Int. Cl.
| | | |
|---|---|---|
| *B60K 17/348* | (2006.01) | |
| *B62D 61/10* | (2006.01) | |
| *F16H 48/05* | (2012.01) | |
| *B60K 17/16* | (2006.01) | |
| *F16H 57/037* | (2012.01) | |
| *F16H 57/02* | (2012.01) | |

(52) U.S. Cl.
CPC ............ *B60K 17/348* (2013.01); *B60K 17/16* (2013.01); *B62D 61/10* (2013.01); *F16H 48/05* (2013.01); *F16H 57/037* (2013.01); *F16H 2057/0203* (2013.01)

(58) Field of Classification Search
CPC ........ B60K 17/348; B62D 61/10; F16H 48/05
See application file for complete search history.

(56) References Cited

U.S. PATENT DOCUMENTS

| | | | | |
|---|---|---|---|---|
| 5,950,750 | A * | 9/1999 | Dong ..................... | B60K 23/08 180/24.08 |
| 7,108,086 | B2 * | 9/2006 | Hurlburt .................. | B60G 5/01 180/22 |
| 9,086,104 | B2 * | 7/2015 | McCann ......... | B60W 30/18145 |
| 9,243,704 | B2 * | 1/2016 | Trost ..................... | F16D 27/108 |
| 10,384,537 | B2 * | 8/2019 | Flogard .................. | B60K 17/35 |
| 2006/0272866 | A1 * | 12/2006 | Ziech ..................... | B60K 17/36 180/24.1 |
| 2006/0276297 | A1 * | 12/2006 | Ziech ..................... | B60K 17/36 475/221 |
| 2008/0053717 | A1 * | 3/2008 | Hurlburt ................ | B62D 61/10 180/24.01 |
| 2009/0166106 | A1 * | 7/2009 | Batdorf .................... | B60K 6/52 180/24.06 |
| 2014/0067215 | A1 | 3/2014 | Wetterlund et al. | |
| 2017/0136932 | A1 * | 5/2017 | Balfour ............... | B60W 10/182 |
| 2017/0174027 | A1 | 6/2017 | Mailhot et al. | |

* cited by examiner

*Primary Examiner* — Faye M Fleming
(74) *Attorney, Agent, or Firm* — Keating and Bennett, LLP

(57) ABSTRACT

A vehicle includes three pairs of wheels, each pair being spaced apart in a right-left direction, three differential gears, respectively corresponding to the three pairs of wheels, and an engine that generates a rotation to be transmitted to the three pairs of wheels through the three differential gears. The engine is located rearward of a front differential gear that is any one of the three differential gears and is fixed to the front differential gear.

16 Claims, 11 Drawing Sheets

VEHICLE

CROSS REFERENCE TO RELATED APPLICATIONS

This application claims the benefit of priority to Japanese Patent Application No. 2018-088342 filed on May 1, 2018. The entire contents of this application are hereby incorporated herein by reference.

BACKGROUND OF THE INVENTION

1. Field of the Invention

The present invention relates to a vehicle that includes three or more pairs of wheels.

2. Description of the Related Art

US 2017/0174027 A1 discloses an off-road four-wheeled vehicle. The four-wheeled vehicle includes a pair of right and left front wheels and a pair of right and left rear wheels. The front wheels and the rear wheels are coupled to the engine through a drive train. The drive train includes a front differential which transmits a motive power of the engine to the pair of front wheels, and a rear differential which transmits the motive power of the engine to the pair of rear wheels. The front differential is located in front of the engine and the rear differential is located at the rear of the engine.

The front differential is coupled to the engine through a driveshaft. A front end of the driveshaft is coupled to the front differential through a universal joint and a rear end of the driveshaft is coupled to the engine through a universal joint. As shown in FIG. 5A of US 2017/0174027 A1, the rear differential is coupled directly to a transmission that is integral with the engine.

With vehicles having three or more pairs of wheels, such as six-wheeled vehicles or eight-wheeled vehicles, etc., there are cases where a differential gear is provided for each pair of wheels. With a six-wheeled vehicle that includes three pairs of wheels, three differential gears are provided, and with an eight-wheeled vehicle that includes four pairs of wheels, four differential gears are provided.

With the four-wheeled vehicle described in US 2017/0174027 A1, the rear differential, which is positioned rearmost, is located at the rear of the engine and is directly coupled to the engine. When the structure described in US 2017/0174027 A1 is applied to a six-wheeled vehicle, the differential gear that is positioned rearmost is located at the rear of the engine and is directly coupled to the engine. The intermediate differential gear is coupled to the engine through a shaft and a universal joint, etc., and the differential gear that is positioned frontmost is coupled to the engine through another shaft and universal joint and the intermediate differential gear, etc. Therefore, when the structure described in US 2017/0174027 A1 is applied to a six-wheeled vehicle, the numbers of shafts and universal joints increase and the vehicle becomes large in a front-rear direction.

Similarly, when the structure described in US 2017/0174027 A1 is applied to an eight-wheeled vehicle or other vehicle that includes four or more pairs of wheels, the numbers of shafts and universal joints increase and the vehicle becomes large in the front-rear direction.

SUMMARY OF THE INVENTION

In order to overcome the previously unrecognized and unsolved challenges described above, preferred embodiments of the present invention provide vehicles that include a pair of first wheels spaced apart in a right-left direction, a pair of second wheels spaced apart in the right-left direction and positioned rearward of the pair of first wheels, a pair of third wheels spaced apart in the right-left direction and positioned rearward of the pair of second wheels, a first differential gear located between the pair of first wheels in the right-left direction, a second differential gear located between the pair of second wheels in the right-left direction, a third differential gear located between the pair of third wheels in the right-left direction, and a prime mover that is located rearward of a front differential gear, which corresponds to any one of the first differential gear, the second differential gear, and the third differential gear, that is fixed to the front differential gear, and that generates a rotation to be transmitted through the first differential gear, the second differential gear, and the third differential gear to the pair of first wheels, the pair of second wheels, and the pair of third wheels.

In accordance with the preferred embodiments described above, the rotation of the prime mover is transmitted to the three pairs of wheels through the three differential gears and the vehicle moves forward or in reverse. The front differential gear that corresponds to any one of the three differential gears is located forward of the prime mover and is fixed to the prime mover. It is therefore possible to reduce the number of parts of the vehicle and make the front differential gear and the prime mover compact in a front-rear direction in comparison to a case in which the front differential gear is coupled to the prime mover through a shaft and a universal joint. Thus, even if three or more pairs of wheels are included, it is possible to reduce a wheelbase (distance in the front-rear direction from a center of a frontmost wheel to a center of a rearmost wheel) and make the vehicle compact in the front-rear direction.

Here, "the prime mover is fixed to the front differential gear" refers to a coupling in which a prime mover case or other portion of prime mover is not capable of moving with respect to the front differential gear. The prime mover and the front differential gear may be coupled directly or may be coupled indirectly through a member other than a frame. For example, a seal, such as an O-ring or a gasket, etc., may be sandwiched by the prime mover and the front differential gear. In this case, although the prime mover and the front differential gear are capable of moving relatively within a range of elastic deformation of the seal, movement of such degree is included in the definition of being fixed. The front differential gear may be coupled directly to just the prime mover or may be coupled directly to the frame or other member besides the prime mover in addition to the prime mover. These definitions also apply to: "the prime mover is fixed to a rear differential gear" and "a transmission is fixed to the prime mover."

According to preferred embodiments of the present invention, at least one of the following features may be added to the vehicle.

A distance in the front-rear direction from a rotational axis of the prime mover to a rotational axis of the front differential gear is shorter than an interval (i.e., a distance) in the right-left direction between the pair of first wheels.

In accordance with the preferred embodiment described above, the front differential gear is close to the prime mover in the front-rear direction. That is, the distance in the front-rear direction from the rotational axis of the prime mover to the rotational axis of the front differential gear is shorter than the interval in the right-left direction between the pair of first wheels. From another standpoint, the interval between the pair of first wheels is widened to achieve the above arrangement. It is possible to make the front differential gear and the prime mover even more compact in the front-rear direction because the front differential gear is located close to the prime mover. It is also possible to widen a width of the vehicle while reducing or minimizing lengths in the front-rear direction of the front differential gear and the prime mover because the interval between the pair of first wheels is wide.

According to a preferred embodiment of the present invention, the vehicle further includes a driveshaft that transmits the rotation transmitted from the prime mover toward the first differential gear, the second differential gear, and the third differential gear, the front differential gear includes a front input gear rotatable around a rotational axis extending in the front-rear direction, and the driveshaft is located on the rotational axis of the front input gear and is coupled to the front input gear but not through a universal joint.

In accordance with the preferred embodiment described above, the rotation of the prime mover is transmitted to the driveshaft. Rotation of the driveshaft is transmitted to the front input gear of the front differential gear. The driveshaft and the front input gear are aligned in the front-rear direction and are located on a straight line extending in the front-rear direction. The driveshaft is coupled to the front input gear but not through a universal joint. It is therefore possible to make the front differential gear and the prime mover compact in the front-rear direction in comparison to a case in which the driveshaft is coupled to the front input gear through a universal joint.

The prime mover is fixed to the front differential gear such that a lubricant flows between an internal space of the prime mover and an internal space of the front differential gear.

In accordance with the preferred embodiment described above, the internal space of the front differential gear is directly connected to the internal space of the prime mover. The lubricant flows back and forth between the internal space of the prime mover and the internal space of the front differential gear. If the lubricant is not able to flow back and forth between the front differential gear and the prime mover, a temperature and the amount of contamination of the lubricant must be checked at each of the front differential gear and the prime mover. On the other hand, if the lubricant flows between the front differential gear and the prime mover, checking the temperature, etc., of the lubricant at either of the front differential gear and the prime mover is practically equivalent to checking the temperature, etc., of the lubricant at both the front differential gear and the prime mover. It is therefore possible to check the temperature and the amount of contamination of the lubricant at one time.

Further, if the internal space of the front differential gear is directly connected to the internal space of the prime mover, the lubricant is supplied to both the front differential gear and the prime mover when the lubricant is supplied to either of the front differential gear and the prime mover. Moreover, when the lubricant is drained from either of the front differential gear and the prime mover, the lubricant is drained from both the front differential gear and the prime mover. When manufacturing the vehicle, the lubricant is poured into the front differential gear and the prime mover. During maintenance of the vehicle, the lubricant inside the front differential gear and the prime mover is replaced with new lubricant. It is therefore possible to reduce the time required to manufacture and maintain the vehicle.

The prime mover includes a piston that reciprocates due to combustion of a fuel, a crankshaft that rotates in accordance with reciprocation of the piston, a connecting rod that connects the piston and the crankshaft, and a crankcase that houses the crankshaft, wherein the front differential gear is fixed to the crankcase.

The front differential gear includes a front gear case that houses a plurality of gears. In this case, the prime mover may include a prime mover case that is different from the front gear case and is fixed to the front gear case, or the prime mover may include a prime mover case that is integral with the front gear case.

The prime mover is located forward of a rear differential gear, which corresponds to any one of the first differential gear, the second differential gear, and the third differential gear, and that is different from the front differential gear, and the prime mover is fixed to the rear differential gear.

In accordance with the preferred embodiment described above, not just the front differential gear located in front of the prime mover but the rear differential gear located at the rear of the prime mover is also fixed to the prime mover. It is therefore possible to reduce the number of parts of the vehicle and make the rear differential gear and the prime mover compact in the front-rear direction in comparison to a case in which the rear differential gear is coupled to the prime mover through a shaft and a universal joint. It is thus possible to reduce a distance in the front-rear direction from a front end of the front differential gear to a rear end of the rear differential gear and to make the vehicle compact in the front-rear direction.

A distance in the front-rear direction from the rotational axis of the prime mover to a rotational axis of the rear differential gear is shorter than the interval in the right-left direction between the pair of first wheels.

In accordance with the preferred embodiment described above, the rear differential gear is close to the prime mover in the front-rear direction. That is, the distance in the front-rear direction from the rotational axis of the prime mover to the rotational axis of the rear differential gear is shorter than the interval in the right-left direction between the pair of first wheels. From another standpoint, the interval between the pair of first wheels is widened to achieve the above arrangement. It is possible to make the rear differential gear and the prime mover even more compact in the front-rear direction because the rear differential gear is located close to the prime mover. It is also possible to widen the width of the vehicle while reducing or minimizing lengths in the front-rear direction of the rear differential gear and the prime mover because the interval between the pair of first wheels is wide.

The distance in the front-rear direction from the rotational axis of the prime mover to the rotational axis of the rear differential gear is shorter than the distance in the front-rear direction from the rotational axis of the prime mover to the rotational axis of the front differential gear.

In accordance with the preferred embodiment described above, the rear differential gear is located closer to the prime mover than the front differential gear. That is, the distance in the front-rear direction from the rotational axis of the prime mover to the rotational axis of the rear differential gear is shorter than the distance in the front-rear direction from the rotational axis of the prime mover to the rotational axis of the front differential gear. The rear differential gear is thus located even closer to the prime mover and it is therefore possible to make the rear differential gear and the prime mover even more compact in the front-rear direction and further reduce the wheelbase of the vehicle.

According to a preferred embodiment of the present invention, the vehicle further includes a driveshaft which transmits the rotation transmitted from the prime mover toward the first differential gear, the second differential gear, and the third differential gear, the rear differential gear includes a rear input gear rotatable around a rotational axis extending in the front-rear direction, and the driveshaft is located on the rotational axis of the rear input gear and is coupled to the rear input gear but not through a universal joint.

In accordance with the preferred embodiment described above, the rotation of the prime mover is transmitted to the driveshaft. Rotation of the driveshaft is transmitted to the rear input gear of the rear differential gear. The driveshaft and the rear input gear are aligned in the front-rear direction and are located on the straight line extending in the front-rear direction. The driveshaft is coupled to the rear input gear but not through a universal joint. It is therefore possible to make the rear differential gear and the prime mover compact in the front-rear direction in comparison to a case in which the driveshaft is coupled to the rear input gear through a universal joint.

The prime mover is fixed to the rear differential gear such that the lubricant flows between the internal space of the prime mover and an internal space of the rear differential gear.

In accordance with the preferred embodiment described above, the internal space of the rear differential gear is directly connected to the internal space of the prime mover. The lubricant flows back and forth between the internal space of the prime mover and the internal space of the rear differential gear. If the lubricant is not able to flow back and forth between the rear differential gear and the prime mover, the temperature and the amount of contamination of the lubricant must be checked at each of the rear differential gear and the prime mover. On the other hand, if the lubricant flows between the rear differential gear and the prime mover, checking the temperature, etc., of the lubricant at either of the rear differential gear and the prime mover is practically equivalent to checking the temperature, etc., of the lubricant at both the rear differential gear and the prime mover. It is therefore possible to check the temperature and the amount of contamination of the lubricant at one time.

Further, if the internal space of the rear differential gear is directly connected to the internal space of the prime mover, the lubricant is supplied to both the rear differential gear and the prime mover when the lubricant is supplied to either of the rear differential gear and the prime mover. Moreover, when the lubricant is drained from either of the rear differential gear and the prime mover, the lubricant is drained from both the rear differential gear and the prime mover. When manufacturing the vehicle, the lubricant is poured into the rear differential gear and the prime mover. During maintenance of the vehicle, the lubricant inside the rear differential gear and the prime mover is replaced with new lubricant. It is therefore possible to reduce the time required to manufacture and maintain the vehicle.

The rear differential gear includes a rear gear case that houses a plurality of gears. In this case, the prime mover may include a prime mover case that is different from the rear gear case and is fixed to the rear gear case, or the prime mover may include a prime mover case that is integral with the rear gear case.

The vehicle further includes a transmission that is fixed to the prime mover and transmits the rotation, transmitted from the prime mover, toward the first differential gear, the second differential gear, and the third differential gear while also changing a speed of the rotation.

The vehicle further includes a seat that includes a front edge located farther forward than a front end of the engine.

If the front differential gear is fixed to the prime mover, although the front differential gear and the prime mover are made compact in the front-rear direction, a weight of a single unit that includes the front differential gear and the prime mover increases. Therefore, if just a powertrain extending from the prime mover to the three pairs of wheels is considered, an imbalance in the weight may occur easily. In accordance with the preferred embodiment described above, the front edge of the seat is located farther forward than the front end of the engine and therefore the feet of a person seated on a seat, etc., are also located farther forward than the front end of the engine. It is therefore possible to alleviate an imbalance in the weight of the powertrain.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Unless noted otherwise, a vehicle 1, placed on a horizontal surface and being in a reference orientation (an orientation in which a steering handle 12 is located at a straight travel position), shall be described below.

A front-rear direction, an up-down direction, and a right-left direction are defined based on the vehicle 1 in the reference orientation. The right-left direction corresponds to a vehicle width direction. A vehicle center WO corresponds to a vertical plane passing through a position at which a space between a pair of wheels opposing each other in the right-left direction (for example, a pair of first wheels W1) is bisected to the right and left. Upstream and downstream refer to upstream and downstream of a power transmission path of transmitting power from an engine 21 to a pair of wheels.

Figure 1:
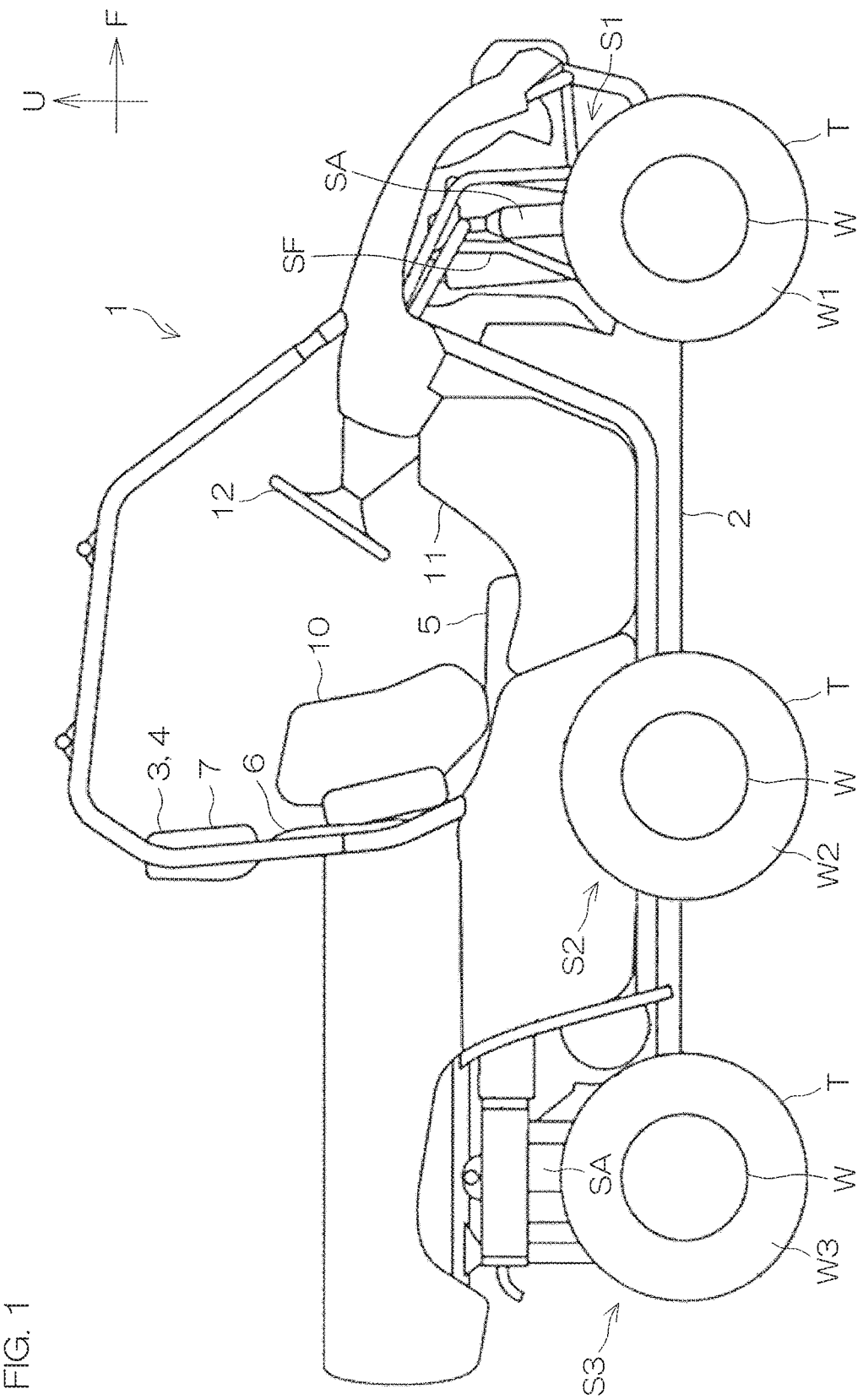
FIG. 1 is a schematic view of a right side surface of a vehicle according to a first preferred embodiment of the present invention.
Figure 2:
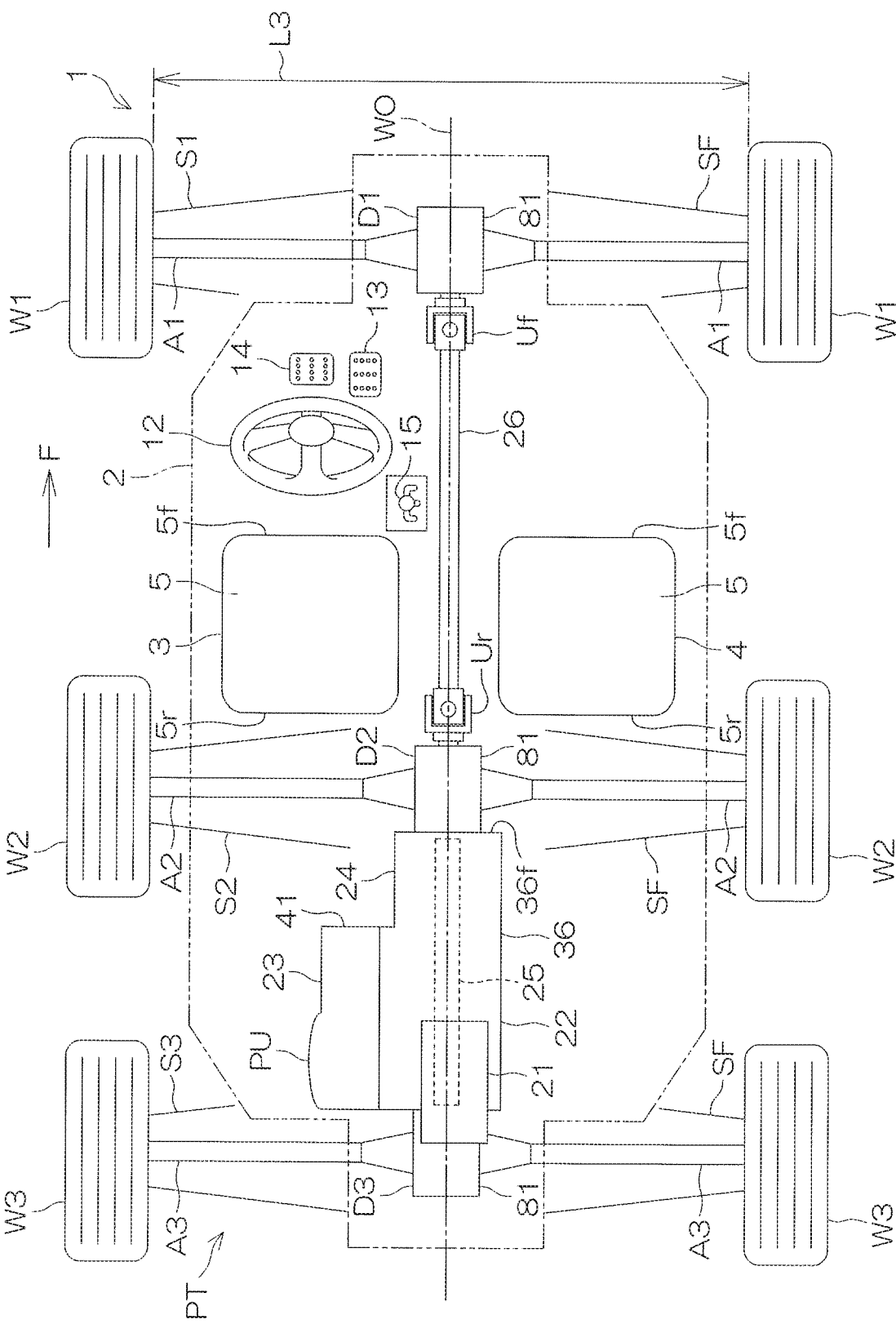
FIG. 2 is a schematic view of a planar layout of a powertrain included in the vehicle.
Figure 3:
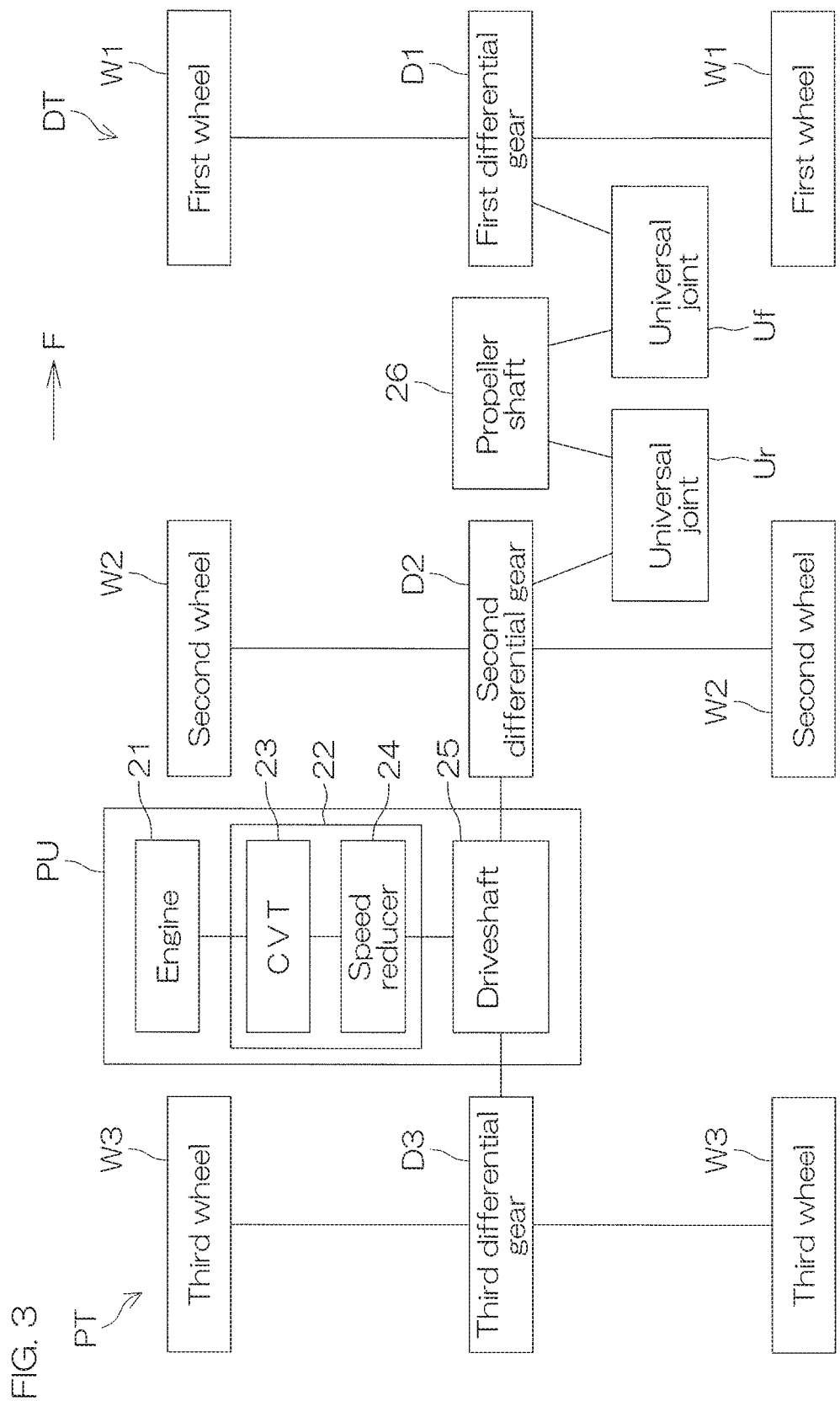
FIG. 3 is a block diagram of the powertrain.

FIG. 1 is a schematic view of a right side surface of the vehicle 1 according to a first preferred embodiment of the present invention. FIG. 2 is a schematic view of a planar layout of a powertrain PT included in the vehicle 1. FIG. 3 is a block diagram of the powertrain PT. "U" and "F" in FIG. 1 respectively corresponds to an upper direction and a front direction of the vehicle 1. The same applies to the other figures.

As shown in FIG. 1, the vehicle 1 includes three pairs of wheels W1 to W3 that roll on a road surface, three suspension units S1 to S3 that support the three pairs of wheels W1 to W3, and a frame 2 that supports the three pairs of wheels W1 to W3 through the three suspension units S1 to S3. Each of the wheels W1 to W3 includes a tire T made of rubber and that contacts the road surface, and a wheel W made of metal and that is surrounded by the tire T.

As shown in FIG. 2, the three pairs of wheels W1 to W3 include a pair of first wheels W1, respectively located at the right and the left of the vehicle center WO, a pair of second wheels W2, respectively located at the right and the left of the vehicle center WO, and a pair of third wheels W3, respectively located at the right and the left of the vehicle center WO. The three wheels W1 to W3 at the right are aligned in the front-rear direction in the order of the first wheel W1, second wheel W2, and third wheel W3 from the front, and the three wheels W1 to W3 at the left are aligned in the front-rear direction in the order of the first wheel W1, second wheel W2, and third wheel W3 from the front.

The first wheels W1 are coupled to the frame 2 through the first suspension unit S1, and the second wheels W2 are coupled to the frame 2 through the second suspension unit S2. The third wheels W3 are coupled to the frame 2 through the third suspension unit S3. The first wheels W1, second wheels W2, and third wheels W3 are movable up and down with respect to the frame 2.

As shown in FIG. 1, the first suspension unit S1 includes suspension frames SF, each supporting a wheel W and being movable up and down with respect to the frame 2, and shock absorbers SA, each absorbing shocks between the suspension frame SF and the frame 2. Similarly, each of the second suspension unit S2 and the third suspension unit S3 includes suspension frames SF and shock absorbers SA.

The vehicle 1 includes a driver seat 3 on which a driver sits. The vehicle 1 may include a side seat 4 located at a side of the driver seat 3, or a rear seat located farther rearward than the driver seat 3. The vehicle 1 may include both the side seat 4 and the rear seat. FIG. 1 shows an example in which the vehicle 1 is provided with the driver seat 3 and the side seat 4. Each of the driver seat 3 and the side seat 4 includes a seat surface 5 that the occupant sits on, a backrest 6 that contacts a back, and a headrest 7 that contacts the back of a head. The backrests 6 extend upward from the seat surfaces 5, and the headrests 7 are located above the backrests 6.

As shown in FIG. 2, a front edge 5$f$ of the seat surface 5 of the driver seat 3 and a front edge 5$f$ of the seat surface 5 of the side seat 4 are located farther forward than a front end 36$f$ of a crankcase 36 corresponding to a front end of the engine 21. FIG. 2 shows an example in which the entire seat surfaces 5 are located farther forward than the front end 36$f$ of the crankcase 36. A rear edge 5$r$ of the seat surface 5 of the driver seat 3 may be located farther rearward than the front end 36$f$ of the crankcase 36. The same applies to the side seat 4.

FIG. 1 shows an example in which the vehicle 1 includes a roof 8, located above the driver seat 3 and the side seat 4, and a roll cage 9, supporting the roof 8. In the present preferred embodiment, the vehicle 1 is provided with a pair of bolsters 10, respectively located at the right and the left of the upper bodies of the driver and a passenger, and a pair of side doors 11, respectively located at the right and the left of the legs of the driver and the passenger. The side doors 11 are capable of opening and closing to the right and left. FIG. 1 shows a state in which the side doors 11 are closed. The roof 8, the roll cage 9, the bolsters 10, and the side doors 11 are not essential features and therefore at least one of these may be omitted as appropriate.

As shown in FIG. 2, the vehicle 1 includes a steering handle 12, operated by the driver to steer the vehicle 1, an accelerator pedal 13, operated by the driver to change an output of the powertrain PT, and a brake pedal 14, operated by the driver to generate braking forces. The vehicle 1 further includes a shift lever 15, operated by the driver to change a shift ratio of the powertrain PT or switch between forward drive and reverse drive of the vehicle 1.

FIG. 2 shows an example in which the steering handle 12 is a steering wheel. The steering handle 12 may be a steering bar instead. In this case, the vehicle 1 may include an accelerator lever in place of the accelerator pedal 13 and may include a brake lever in place of or in addition to the brake pedal 14. The first wheels W1 and the second wheels W2 are steered wheels that are steered in accordance with the operation of the steering handle 12, and the third wheels W3 are non-steered wheels that are not steered even when the steering handle 12 is operated.

As shown in FIG. 3, the powertrain PT includes the engine 21 (internal combustion engine, for example), that generates the power that causes the vehicle 1 to travel, and a drivetrain DT which transmits the power of the engine 21 to the three pairs of wheels W1 to W3. The drivetrain DT is the powertrain PT from which the engine 21 is removed. The three pairs of wheels W1 to W3 are included in the drivetrain DT.

The engine 21 is an example of a prime mover. The powertrain PT may include an electric motor in place of the engine 21 or may include both the engine 21 and an electric motor. The engine 21 is supported by the frame 2. The engine 21 may be coupled directly to the frame 2 or may be coupled indirectly to the frame 2. For example, a mount damper, made of rubber or resin, may be interposed between the engine 21 and the frame 2.

The drivetrain DT extends from the engine 21 to each of the six wheels W1 to W3. The drivetrain DT includes an automatic transmission 22 which transmits downstream rotation transmitted from the engine 21 while changing a speed of the rotation continuously or stepwise, and a driveshaft 25 which transmits downstream rotation transmitted from the automatic transmission 22. The automatic transmission 22 includes a CVT (continuously variable transmission) 23, that changes the speed of the rotation, transmitted from the engine 21, at any shift ratio within a predetermined shift range, and a speed reducer 24 that reduces the speed of rotation transmitted from the CVT 23.

The drivetrain DT further includes a first differential gear D1 which transmits rotation transmitted from the driveshaft 25 toward the pair of first wheels W1, a second differential gear D2 which transmits the rotation transmitted from the driveshaft 25 toward the pair of second wheels W2, and a third differential gear D3 which transmits the rotation transmitted from the driveshaft 25 toward the pair of third wheels W3. The engine 21, the automatic transmission 22, and the driveshaft 25 are included in a power unit PU that generates the power (rotational force) that causes the vehicle 1 to travel and is located upstream of the three differential gears D1 to D3.

The first differential gear D1 is located in front of the second differential gear D2. The drivetrain DT includes a propeller shaft 26 which transmits the rotation, transmitted from the driveshaft 25 to the second differential gear D2, toward the first differential gear D1. A front end portion of the propeller shaft 26 is coupled to the first differential gear D1 through a front universal joint Uf and a rear end portion of the propeller shaft 26 is coupled to the second differential gear D2 through a rear universal joint Ur. The second differential gear D2 is located in front of the power unit PU. The third differential gear D3 is located at the rear of the power unit PU. The second differential gear D2 is an example of a front differential gear and the third differential gear D3 is an example of a rear differential gear.

The first differential gear D1 is located between the pair of first wheels W1 in the right-left direction. The right first wheel W1 is coupled to the first differential gear D1 through a right first axle A1 and the left first wheel W1 is coupled to the first differential gear D1 through a left first axle A1. The pair of first wheels W1 are thus coupled to the power unit PU through the pair of first axles A1, the first differential gear D1, the front universal joint Uf, the propeller shaft 26, the rear universal joint Ur, and the second differential gear D2.

The second differential gear D2 is located between the pair of second wheels W2 in the right-left direction. The right second wheel W2 is coupled to the second differential gear D2 through a right second axle A2 and the left second wheel W2 is coupled to the second differential gear D2 through a left second axle A2. Similarly, the third differential gear D3 is located between the pair of third wheels W3. The right third wheel W3 is coupled to the third differential gear D3 through a right third axle A3 and the left third wheel W3 is coupled to the third differential gear D3 through a left third axle A3. As shall be described below, the second differential gear D2 and the third differential gear D3 are fixed to the power unit PU.

The power unit PU included in the power train PT shall now be described.

Figure 4:
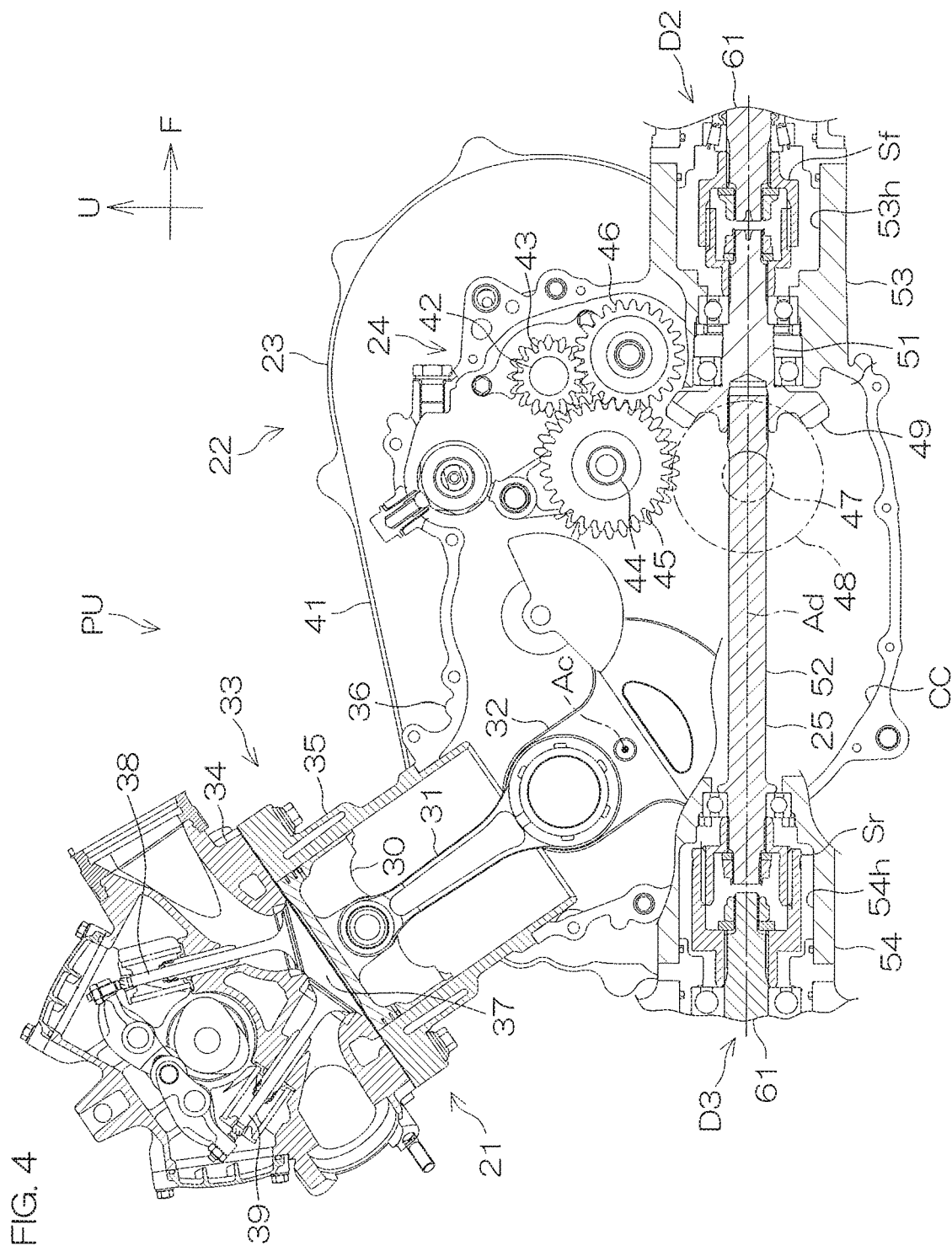
FIG. 4 is a sectional view showing a vertical section of a power unit, in which an engine, an automatic transmission, and a driveshaft are unitized.

FIG. 4 is a sectional view showing a vertical section of the power unit PU, in which the engine 21, the automatic transmission 22, and the driveshaft 25 are unitized.

As shown in FIG. 4, the engine 21 includes a piston 30 which reciprocates due to combustion of a fuel, a crankshaft 32 which rotates in accordance with the reciprocation of the piston 30, and a connecting rod 31 which connects the piston 30 and the crankshaft 32. The engine 21 further includes a cylinder 33 which houses the piston 30, and a crankcase 36 which houses the crankshaft 32.

The cylinder 33 includes a cylinder body 35 which houses the piston 30, and a cylinder head 34 that, together with the piston 30 and the cylinder body 35, defines a combustion chamber 37, in which a gaseous mixture of air and the fuel is combusted. The engine 21 further includes an intake valve 38 which opens and closes an intake port that is open at an inner surface of the combustion chamber 37, and an exhaust valve 39 which opens and closes an exhaust port that is open at the inner surface of the combustion chamber 37. The cylinder body 35 extends upward from the crankcase 36. The crankcase 36 defines a crank chamber CC housing the crankshaft 32. The crank chamber CC houses the speed reducer 24 in addition to the crankshaft 32.

In FIG. 4, a direction perpendicular or substantially perpendicular to the paper surface corresponds to the right-left direction of the vehicle 1. In FIG. 4, a rotational axis Ac of the crankshaft 32 extends in the direction perpendicular or substantially perpendicular to the paper surface. The crankshaft 32 is thus located such that the rotational axis Ac of the crankshaft 32 extends in the right-left direction in plan view. The crankshaft 32 may instead be located such that the rotational axis Ac of the crankshaft 32 extends in the front-rear direction in plan view.

Rotation of the crankshaft 32 is transmitted to the CVT 23. Although not illustrated, the CVT 23 includes a primary shaft, a drive pulley, an endless belt, a driven pulley, and a secondary shaft. The rotation of the crankshaft 32 is transmitted to the primary shaft and the drive pulley. Rotation of the drive pulley is transmitted, while its speed is changed continuously, to the driven pulley by the endless belt. The secondary shaft rotates, together with the driven pulley, around a center line of the secondary shaft. The rotation of the crankshaft 32 is thus transmitted to the secondary shaft.

The CVT 23 includes a transmission case 41 that houses the primary shaft, the drive pulley, the endless belt, the driven pulley, and the secondary shaft. The transmission case 41 is located at a side of the crankcase 36. The transmission case 41 overlaps with the crankcase 36 in a side view. The transmission case 41 is fixed to the crankcase 36. At least a portion of the transmission case 41 may be integral with the crankcase 36 or may be a member different from the crankcase 36 and fixed to the crankcase 36.

The speed reducer 24 includes an upstream shaft 42, a plurality of upstream gears 43, a plurality of intermediate gears 45, an intermediate shaft 44, and an idle gear 46. The plurality of upstream gears 43 include an upstream forward gear and an upstream reverse gear that rotate together with the upstream shaft 42. The plurality of intermediate gears 45 include an intermediate forward gear that engages with the upstream forward gear, and an intermediate reverse gear that engages with the upstream reverse gear through the idle gear 46. The intermediate forward gear and the intermediate reverse gear are rotatable around a center line of the intermediate shaft 44 with respect to the intermediate shaft 44. A gear coupled to the intermediate shaft 44 is switched between the intermediate forward gear and the intermediate reverse gear in accordance with an operation of the shift lever 15 (see FIG. 2).

The rotation output from the CVT 23 (rotation of the secondary shaft) is transmitted to the upstream shaft 42, the upstream forward gear, and the upstream reverse gear. When the vehicle 1 is to move forward, rotation of the upstream shaft 42 is transmitted to the intermediate shaft 44 through the upstream forward gear and the intermediate forward gear. When the vehicle 1 is to move in reverse, the rotation of the upstream shaft 42 is transmitted to the intermediate shaft 44 through the upstream reverse gear, the idle gear 46, and the intermediate reverse gear. A rotation direction of the intermediate shaft 44 is switched in accordance with the operation of the shift lever 15.

The speed reducer 24 further includes a downstream gear, a downstream shaft 47, a downstream drive gear 48, and a final gear 49. The plurality of intermediate gears 45 include an intermediate drive gear that rotates together with the intermediate shaft 44. Rotation of the intermediate shaft 44 is transmitted to the downstream shaft 47 through the downstream gear engaging with the intermediate drive gear. Rotation of the downstream shaft 47 is transmitted from the downstream drive gear 48, that rotates together with the downstream shaft 47, to the final gear 49, that engages with the downstream drive gear 48. The final gear 49 rotates in the same direction and at the same speed as the driveshaft 25. The rotation of the secondary shaft is thus transmitted to the driveshaft 25.

FIG. 4 shows an example in which the driveshaft 25 is divided into a front driveshaft 51 and a rear driveshaft 52 and the final gear 49 is integral with the front driveshaft 51. The driveshaft 25 may be a single shaft corresponding to the front driveshaft 51 and the rear driveshaft 52. The final gear 49 may be a member that is separate from the driveshaft 25 and is splined to the driveshaft 25. A rotation center of the driveshaft 25 and a rotation center of the final gear 49 are located on a rotational axis Ad extending in the front-rear direction.

The front driveshaft 51 is located in front of the rear driveshaft 52. The front driveshaft 51 extends forward from the final gear 49. A front end portion of the rear driveshaft 52 is inserted inside the final gear 49. The rear driveshaft 52 extends rearward from the final gear 49. An outer peripheral surface of the rear driveshaft 52 is splined to an inner peripheral surface of the final gear 49. The front driveshaft 51 and the rear driveshaft 52 rotate around the rotational axis Ad in the same direction and at the same speed as the final gear 49.

The front driveshaft 51 is coupled to an input gear 61 of the second differential gear D2 through a front spline joint Sf. The rear driveshaft 52 is coupled to an input gear 61 of the third differential gear D3 through a rear spline joint Sr. The front driveshaft 51 may be coupled to the input gear 61 of the second differential gear D2 through a joint other than a spline joint. Similarly, the rear driveshaft 52 may be coupled to the input gear 61 of the third differential gear D3 through a joint other than a spline joint.

The front driveshaft 51 is inserted in a front tube 53 of the crankcase 36. The rear driveshaft 52 is inserted in a rear tube 54 of the crankcase 36. A communicating hole 53h, connecting the crank chamber CC and a space outside the crankcase 36, is provided in the front tube 53. A communicating hole 54h, connecting the crank chamber CC and the space outside the crankcase 36, is provided in the rear tube 54. The front tube 53 and the rear tube 54 surround the rotational axis Ad of the driveshaft 25.

The three differential gears D1 to D3 shall now be described.

Figure 5:
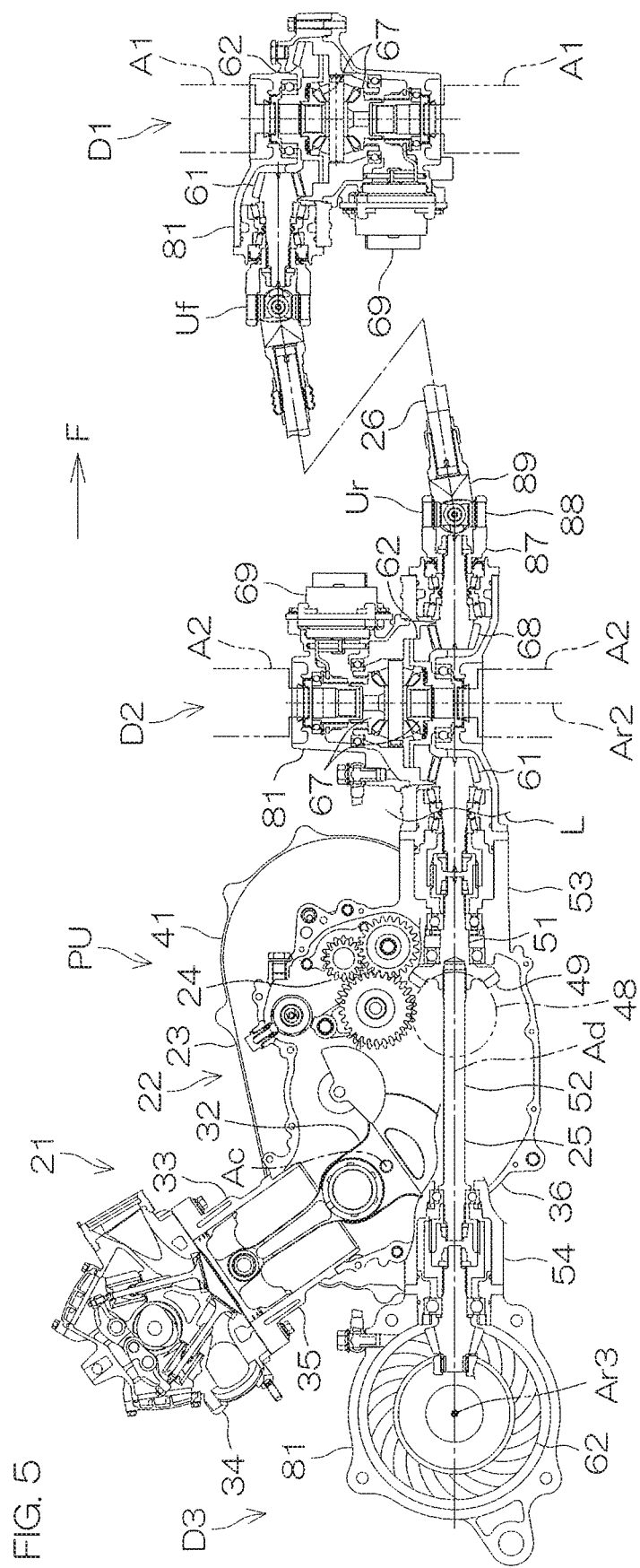
FIG. 5 is a sectional view of the power unit and three differential gears.
Figure 6A:
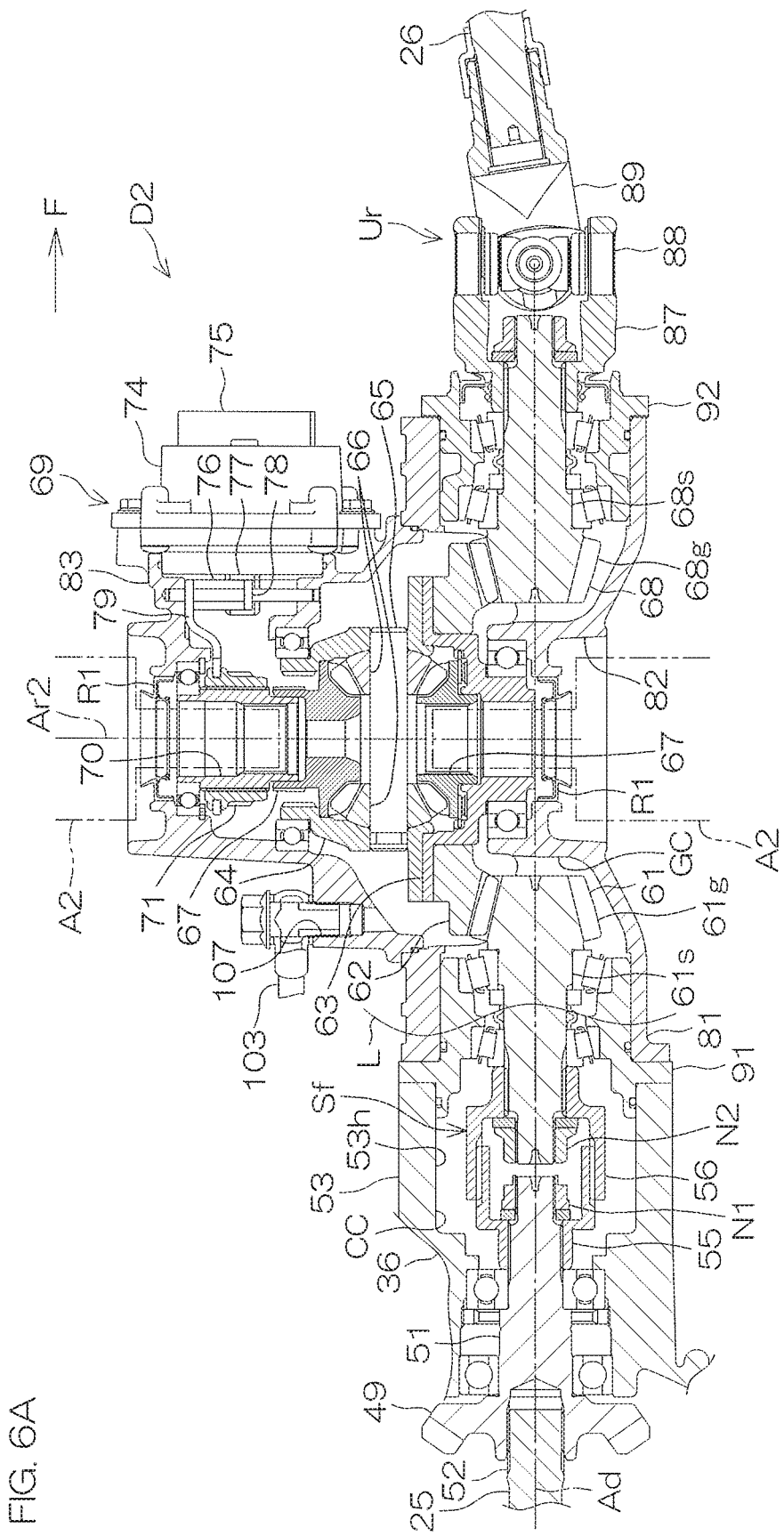
FIG. 6A is a sectional view of a second differential gear.
Figure 6B:
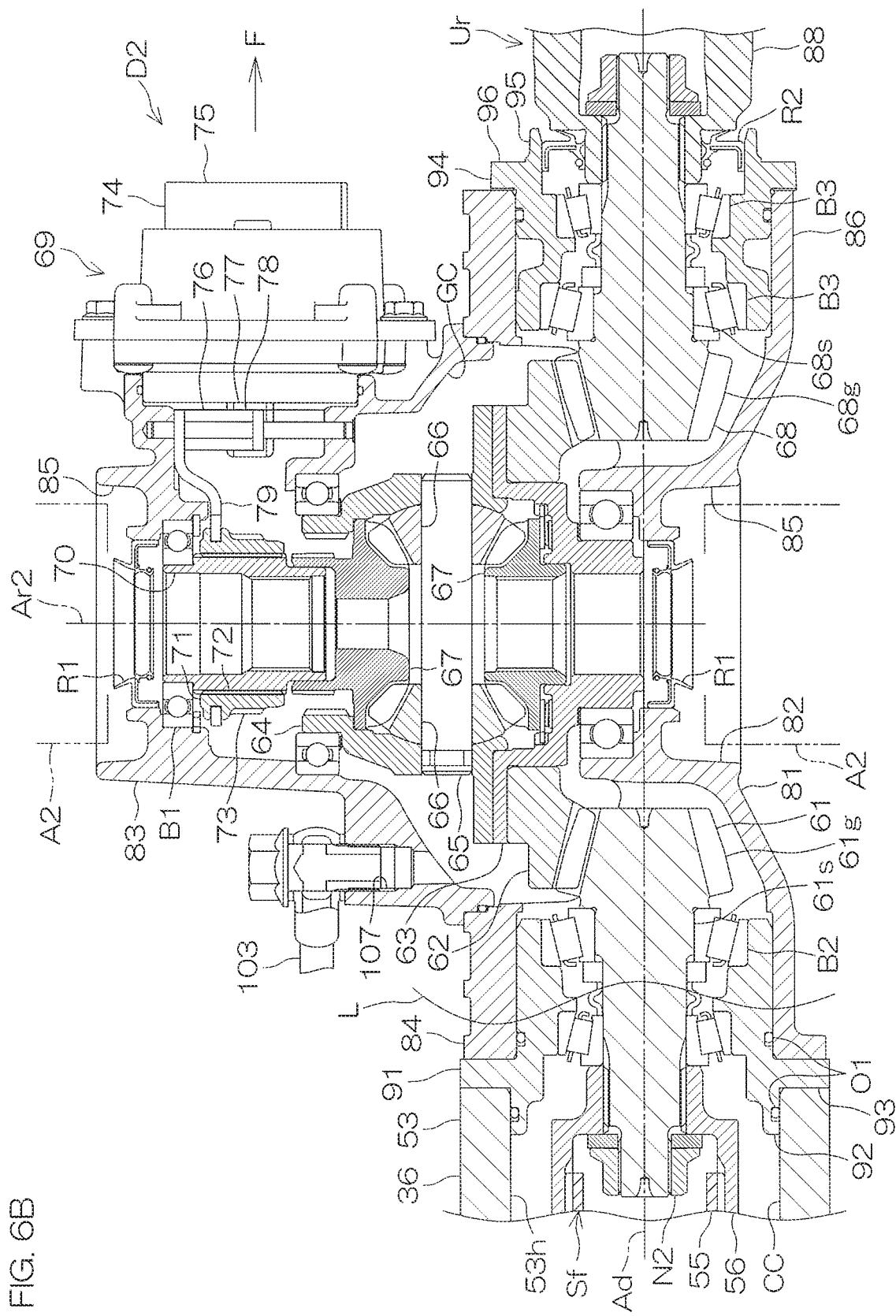
FIG. 6B is an enlarged view of a portion of FIG. 6A.
Figure 7:
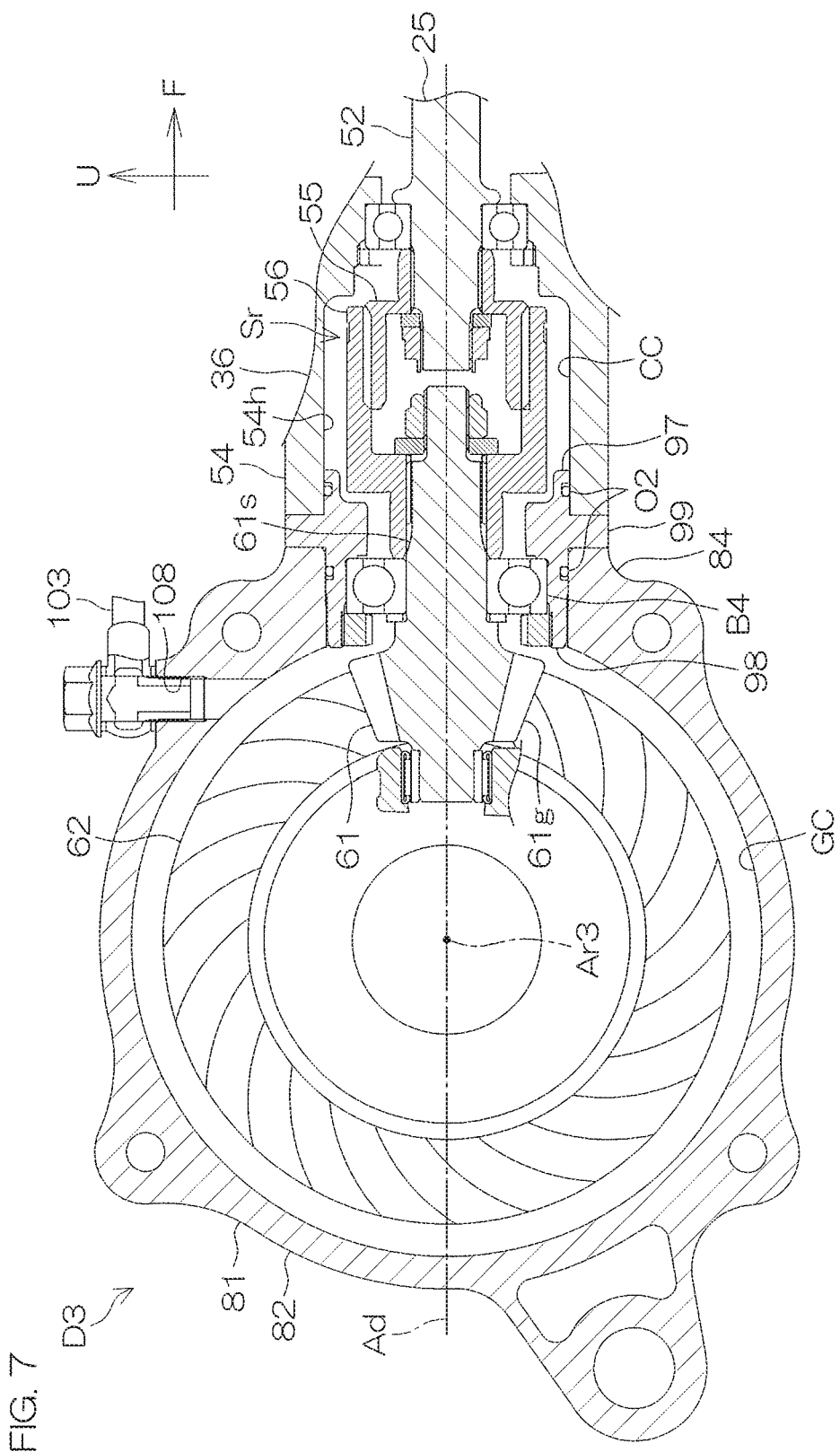
FIG. 7 is a sectional view of a third differential gear.

FIG. 5 is a sectional view of the power unit PU and the three differential gears D1 to D3. FIG. 6A is a sectional view of the second differential gear D2 and FIG. 6B is an enlarged view of a portion of FIG. 6A. FIG. 7 is a sectional view of the third differential gear D3. In a region farther to the left of a wavy line L1 in each of FIG. 5, FIG. 6A, and FIG. 6B, an upper direction on the paper surface corresponds to an upper direction of the vehicle 1 and in a region farther to the right of the wavy line L1 in each of FIG. 5, FIG. 6A, and FIG. 6B, the upper direction on the paper surface corresponds to a left direction of the vehicle 1. The same applies to FIG. 8 to be described below.

As shown in FIG. 5, each of the first differential gear D1 and the third differential gear D3 has the same arrangement as the second differential gear D2 with the exception of an output gear 68 and an arrangement related to the output gear 68. Therefore, in the following description, the second differential gear D2 shall be described and detailed description of the first differential gear D1 and the third differential gear D3 shall be omitted.

When a component of the first differential gear D1 or the third differential gear D3 is mentioned, "of the first differential gear D1" or "of the third differential gear D3" shall be included to identify the component. For example, when a gear case 81 is mentioned, it refers to the gear case 81 of the third differential gear D3. However, for a component of the second differential gear D2, nothing shall be included to identify the component as a rule, although there are cases in which "of the second differential gear D2" is included to identify the component.

As shown in FIG. 6A, the second differential gear D2 includes the input gear 61 that is located most upstream in the power transmission path extending from the engine 21 to the second differential gear D2. The input gear 61 is a bevel gear. The input gear 61 includes a shaft portion 61s extending in the front-rear direction, and a gear portion 61g joined to a tip of the shaft portion 61s. The shaft portion 61s is inserted in the front tube 53 of the crankcase 36. The shaft portion 61s is coupled to the front driveshaft 51 through the front spline joint Sf.

The front spline joint Sf includes an inner cylinder 55 having an outer peripheral surface provided with a plurality of spline grooves, and an outer cylinder 56 having an inner peripheral surface provided with a plurality of spline teeth engaging with the plurality of spline grooves. The inner cylinder 55 is inserted inside the outer cylinder 56. The inner cylinder 55 and the outer cylinder 56 are movable relatively in the front-rear direction. Torque is transmitted between the inner cylinder 55 and the outer cylinder 56 through the spline grooves and the spline teeth.

One of the inner cylinder 55 and the outer cylinder 56 is fixed to the front driveshaft 51 and the other of the inner cylinder 55 and the outer cylinder 56 is fixed to the input gear 61. FIG. 6A shows an example in which the inner cylinder 55 is fixed to the front driveshaft 51 and the outer cylinder 56 is fixed to the input gear 61. The inner cylinder 55 is fixed to the front driveshaft 51 by a nut N1, for example. The outer cylinder 56 is fixed to the input gear 61 by a nut N2, for example.

The second differential gear D2 includes, in addition to the input gear 61, a ring gear 62 that engages with the input gear 61, a pair of pinions 66 that rotate together with the ring gear 62 around a rotational axis Ar2 of the ring gear 62, and a pair of side gears 67 that engages with the pair of pinions 66. The second differential gear D2 further includes a cylindrical or substantially cylindrical gear base 63 that holds the ring gear 62, a cylindrical or substantially cylindrical shaft holder 64 coupled to the gear base 63, and a pinion shaft 65 held by the shaft holder 64.

The pair of pinions 66 oppose each other from the front and rear across an interval. The pinion shaft 65 is inserted in the pair of pinions 66. The pair of pinions 66 are rotatable, with respect to the pinion shaft 65, around a center line of the pinion shaft 65. The pair of side gears 67 are respectively located to the right and the left of the pinion shaft 65. The pair of side gears 67 oppose each other from the right and left across an interval. The pair of side gears 67 surround the rotational axis Ar2 of the ring gear 62.

The gear base 63 surrounds the right side gear 67. The shaft holder 64 is located to the left of the gear base 63. The shaft holder 64 surrounds the left side gear 67. The shaft holder 64 further surrounds the pair of pinions 66. The gear base 63, the shaft holder 64, and the pinion shaft 65 rotate together with the ring gear 62 around the rotational axis Ar2 of the ring gear 62.

The second differential gear D2 includes a differential switching unit 69 that switches a state of the second differential gear D2 among a plurality of states including a differential lock state, a differential unlock state, and a free state. The differential lock state and the differential unlock state are states in which the power of the engine 21 is transmitted to the pair of second axles A2 and the free state is a state in which the power transmission path connecting the engine 21 and the pair of second axles A2 is disconnected. The differential lock state is a state in which the pair of second axles A2 are rotatable at mutually different rotation speeds, and the differential unlock state is a state in which the pair of second axles A2 rotate at a mutually equal rotation speed.

The differential switching unit 69 includes a sleeve 70 that rotates together with a second axle A2, a slide tube 71 movable in an axial direction of the sleeve 70 with respect to the sleeve 70, and an electric switching unit 74 that makes the slide tube 71 move in the axial direction of the sleeve 70. The electric switching unit 74 includes an electric motor 75 that generates power that moves the slide tube 71, and a motion converter 76 that converts rotation of the electric motor 75 to rectilinear movement of the slide tube 71. FIG. 6A shows an example in which the motion converter 76 includes a pinion 77 that rotates together with an output shaft of the electric motor 75, and a rack 78 that engages with the pinion 77. When the electric motor 75 rotates, the rack 78 moves rectilinearly with respect to the pinion 77. Rectilinear movement of the rack 78 is transmitted to the slide tube 71 by a slide lever 79 of the motion converter 76.

The sleeve 70 is surrounded by the slide tube 71. The sleeve 70 is inserted in the left side gear 67. The sleeve 70 extends leftward from the left side gear 67. The sleeve 70 is held by a gear case 81 through a bearing B1 (see FIG. 6B) surrounding the sleeve 70. The sleeve 70 is not coupled to the left side gear 67 and is rotatable around the rotational axis Ar2 of the ring gear 62 with respect to the left side gear 67.

The left second axle A2 is inserted in the sleeve 70. An outer peripheral surface of the left second axle A2 is splined to an inner peripheral surface of the sleeve 70. The sleeve 70 rotates around the rotational axis Ar2 of the ring gear 62 together with the left axle A2. On the other hand, the right second axle A2 is inserted in the right side gear 67 through the gear base 63. An outer peripheral surface of the right second axle A2 is splined to an inner peripheral surface of the right side gear 67. The right side gear 67 rotates around the rotational axis Ar2 of the ring gear 62 together with the right second axle A2.

As shown in FIG. 6B, the slide tube 71 includes an inner engaging portion 72 provided on an inner peripheral surface of the slide tube 71. The inner engaging portion 72 is splined to an outer peripheral surface of the sleeve 70. FIG. 6B shows a state in which the inner engaging portion 72 is engaged with just the outer peripheral surface of the sleeve 70. The slide tube 71 is movable in an axial direction of the sleeve 70 along the outer peripheral surface of the sleeve 70. When the slide tube 71 moves toward the side gear 67, the inner engaging portion 72 becomes splined to an outer peripheral surface of the side gear 67 as well. In this state, the sleeve 70 rotates together with the side gear 67.

In addition to the inner engaging portion 72, the slide tube 71 includes an outer engaging portion 73 provided on an outer peripheral surface of the slide tube 71. When the slide tube 71 moves toward the side gear 67, the outer engaging portion 73 becomes splined to an inner peripheral surface of the shaft holder 64. During this process, the inner engaging portion 72 becomes splined to the outer peripheral surface of the sleeve 70 and the outer peripheral surface of the side gear 67. Therefore, when the outer engaging portion 73 engages with the inner peripheral surface of the shaft holder 64, the sleeve 70 is prevented from rotating with respect to the ring gear 62 and rotates together with the ring gear 62.

The electric switching unit 74 moves the slide tube 71 to any of a plurality of positions including a differential lock position, a differential unlock position, and a free position. FIG. 6B shows a state in which the slide tube 71 is located at the free position. The state of the second differential gear D2 is switched in accordance with the movement of the slide tube 71. The differential lock position is a position at which the second differential gear D2 is set in the differential lock state, and the differential unlock position is a position at which the second differential gear D2 is set in the differential unlock state. The free position is a position at which the second differential gear D2 is set in the free state.

The free position is a position at which the slide tube 71 is splined to the sleeve 70 and not splined to the side gear 67 and the shaft holder 64. The differential unlock position is a position at which the slide tube 71 is splined to the sleeve 70 and the side gear 67 and not splined to the shaft holder 64. The differential lock position is a position at which the slide tube 71 is splined to the sleeve 70, the side gear 67, and the shaft holder 64. When a differential switching switch, provided at the driver seat, is operated by an operator, the electric switching unit 74 causes the slide tube 71 to be moved to a position in accordance with the operation of the differential switching switch. The state of the second differential gear D2 is thus switched.

In addition to the input gear 61 and the ring gear 62, etc., the second differential gear D2 includes an output gear 68 that engages with the ring gear 62. The output gear 68 is a bevel gear. The output gear 68 includes a shaft portion 68s extending in the front-rear direction, and a gear portion 68g joined to a tip of the shaft portion 68s. The shaft portion 68s extends forward from the gear portion 68g. The output gear 68 is coupled to a rear end portion of the propeller shaft 26 through the rear universal joint Ur. As shown in FIG. 5, the front end portion of the propeller shaft 26 is coupled to an input gear 61 of the first differential gear D1 through the front universal joint Uf. FIG. 5 shows an example in which the rear universal joint Ur and the front universal joint Uf are cross universal joints, for example.

As shown in FIG. 5, the rear universal joint Ur includes a U-shaped drive yoke 87 fixed to the output gear 68 as a driving shaft, a U-shaped driven yoke 89 fixed to the propeller shaft 26 as a driven shaft, and a cross shaft 88 held by the drive yoke 87 and the driven yoke 89. Rotation of the output gear 68 is transmitted to the propeller shaft 26 by the rear universal joint Ur. The rear universal joint Ur transmits the rotation of the output gear 68 to the propeller shaft 26 while allowing an angle defined by the output gear 68 and the propeller shaft 26 to change.

When the input gear 61 of the second differential gear D2 rotates, the ring gear 62 of the second differential gear D2 also rotates and rotation of the input gear 61 is transmitted to the output gear 68 of the second differential gear D2 through the ring gear 62. The rotation transmitted to the output gear 68 is transmitted to the first differential gear D1 through the rear universal joint Ur and the front universal joint Uf, provided at respective ends of the propeller shaft 26, and the propeller shaft 26. Power transmitted to the first differential gear D1 is transmitted to the pair of first wheels W1 through the input gear 61, a ring gear 62, a pair of pinions 66, and a pair of side gears 67 of the first differential gear D1. The pair of first wheels W1 is thus driven in the rotation direction.

As shown in FIG. 6B, the second differential gear D2 includes the gear case 81 that houses the plurality of gears included in the second differential gear D2, such as the input gear 61, the ring gear 62, etc. The gear case 81 includes a main case 82 housing the input gear 61, and a sub case 83 fixed by a bolt to the main case 82. The main case 82 and the sub case 83 define a gear chamber GC housing all of the gears included in the second differential gear D2, such as the input gear 61, etc.

The gear case 81 includes a cylindrical or substantially cylindrical upstream opening portion 84 surrounding the input gear 61, a pair of cylindrical or substantially cylindrical side opening portions 85, respectively surrounding the pair of second axles A2, and a cylindrical or substantially cylindrical downstream opening portion 86 surrounding the output gear 68. The upstream opening portion 84 and the downstream opening portion 86 are portions of the main case 82. The upstream opening portion 84 and the downstream opening portion 86 surround the rotational axis Ad. The right side opening portion 85 is a portion of the main case 82 and the left side opening portion 85 is a portion of the sub case 83.

The shaft portion 61s of the input gear 61 projects rearward from the upstream opening portion 84. The shaft portion 61s of the input gear 61 is supported by the upstream opening portion 84 through a bearing B2 and an adapter 91. Similarly, the shaft portion 68s of the output gear 68 projects forward from the downstream opening portion 86. The shaft portion 68s of the output gear 68 is supported by the downstream opening portion 86 through a bearing B3 and an adapter 94. The right second axle A2 is inserted in the right side opening portion 85 and the left second axle A2 is inserted in the left side opening portion 85. Annular gaps between the second axles A2 and the side opening portions 85 are sealed by seal rings R1 surrounding the second axles A2.

The upstream opening portion 84 of the gear case 81 of the second differential gear D2 is fixed to the front tube 53 of the crankcase 36 through the adapter 91. The gear case 81 of the second differential gear D2 is an example of a front gear case and the crankcase 36 is an example of a prime mover case. The gear case 81 may be fixed to the crankcase 36 by a bolt, for example, or may be fixed to the crankcase 36 by another method such as welding, press fitting, etc. The gear case 81 may be fixed directly to the crankcase 36 without interposition of the adapter 91 or may be integral with the crankcase 36. The same applies to the gear case of the third differential gear D3.

The adapter 91 includes a main tube 92 surrounded by both the crankcase 36 and the gear case 81, and an annular flange 93 projecting to a radially outer side of the upstream opening portion 84 from an outer peripheral surface of the main tube 92. The flange 93 is sandwiched from the front and rear by the front tube 53 and the upstream opening portion 84. The gear case 81 is fixed to the crankcase 36 in the front-rear direction.

An annular gap between the main tube 92 and the front tube 53 is sealed by an O-ring O1, which surrounds the adapter 91 between the adapter 91 and the front tube 53. Similarly, an annular gap between the main tube 92 and the upstream opening portion 84 is sealed by an O-ring O1, which surrounds the adapter 91 between the adapter 91 and the upstream opening portion 84. The gear case 81 is fixed in a radial direction of the upstream opening portion 84 with respect to the crankcase 36.

The adapter 91 supports the input gear 61 through the bearing B2 surrounding the input gear 61. An annular space between the adapter 91 and the input gear 61 extends from the gear chamber GC to the crank chamber CC. In other words, the crank chamber CC is connected to the gear chamber GC through the annular space between the adapter 91 and the input gear 61. A fluid, such as a lubricant, etc., moves between the crank chamber CC and the gear chamber GC through an internal gap of the bearing B2 located between the adapter 91 and the input gear 61.

The adapter 94 includes a main tube 95 surrounded by the gear case 81, and an annular flange 96 projecting to a radially outer side of the downstream opening portion 86 from an outer peripheral surface of the main tube 95. The flange 96 is located outside the gear case 81. The main tube 95 supports the output gear 68 through the bearing B3 surrounding the output gear 68. The drive yoke 87 of the rear universal joint Ur is inserted inside the main tube 95. A gap between an outer peripheral surface of the drive yoke 87 and an inner peripheral surface of the main tube 95 is sealed by a seal ring R2 held by the adapter 94.

As shown in FIG. 7, an upstream opening portion 84 provided at the gear case 81 of the third differential gear D3 is fixed to the rear tube 54 of the crankcase 36 through an adapter 97. The adapter 97 includes a main tube 98 surrounded by both the crankcase 36 and the gear case 81, and an annular flange 99 projecting to a radially outer side of the upstream opening portion 84 from an outer peripheral surface of the main tube 98. The flange 99 is sandwiched from the front and rear by the rear tube 54 and the upstream opening portion 84. The gear case 81 of the third differential gear D3 is fixed to the crankcase 36 in the front-rear direction. The gear case 81 of the third differential gear D3 is an example of a rear gear case and the crankcase 36 is an example of the prime mover case.

An annular gap between the main tube 98 and the rear tube 54 is sealed by an O-ring O2, which surrounds the adapter 97 between the adapter 97 and the rear tube 54. Similarly, an annular gap between the main tube 98 and the upstream opening portion 84 is sealed by an O-ring O2, which surrounds the adapter 97 between the adapter 97 and the upstream opening portion 84. The gear case 81 of the third differential gear D3 is fixed in a radial direction of the upstream opening portion 84 with respect to the crankcase 36.

The adapter 97 supports the input gear 61 of the third differential gear D3 through a bearing B4 surrounding the input gear 61. An annular space between the adapter 97 and the input gear 61 extends from the gear chamber GC of the third differential gear D3 to the crank chamber CC. A fluid, such as the lubricant, etc., moves between the crank chamber CC and the gear chamber GC through an internal gap of the bearing B4 located between the adapter 97 and the input gear 61.

A rotational axis Ar3 of the ring gear 62 of the third differential gear D3 corresponds to a rotational axis Ar3 of the third differential gear D3. The rotational axis Ar2 of the ring gear 62 of the second differential gear D2 corresponds to a rotational axis Ar2 of the second differential gear D2. The rotational axis Ac of the crankshaft 32 corresponds to a rotational axis Ac of the engine 21. A length in the right-left direction of a space between the pair of first wheels W1 corresponds to an interval L3 in the right-left direction between the pair of first wheels W1 (see FIG. 2).

Figure 8:
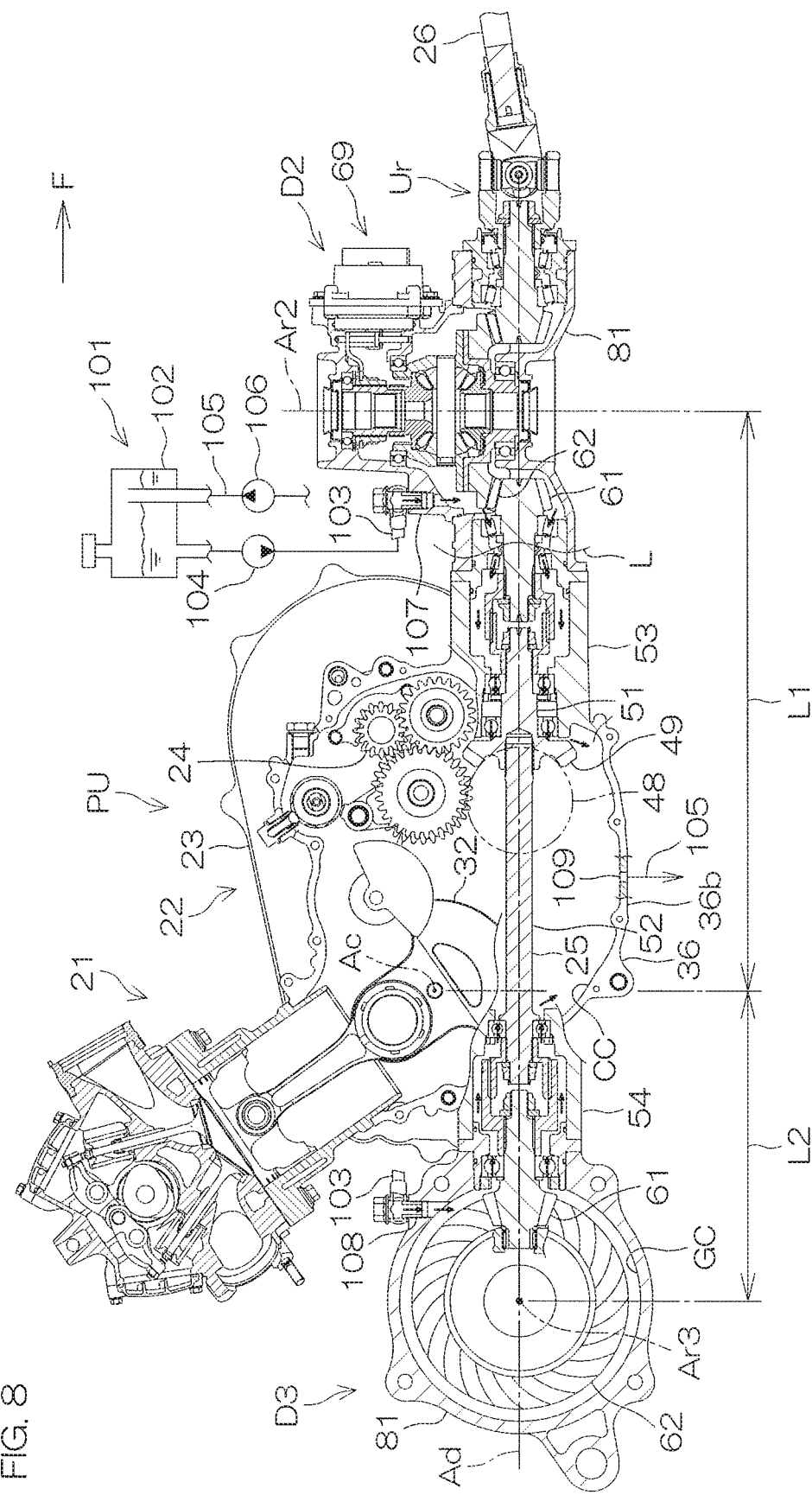
FIG. 8 is a sectional view of the power unit, the second differential gear, and the third differential gear.

As shown in FIG. 8, a distance L1 in the front-rear direction from the rotational axis Ac of the engine 21 to the rotational axis Ar2 of the second differential gear D2 is shorter than the interval L3 in the right-left direction between the pair of first wheels W1 (see FIG. 2). Similarly, a distance L2 in the front-rear direction from the rotational axis Ac of the engine 21 to the rotational axis Ar3 of the third differential gear D3 is shorter than the interval L3 between the pair of first wheels W1. The distance L2 is shorter than the distance L1. The magnitude relationship of the distances L1 and L2 and the interval L3 is just one example, and the present invention is not limited thereto.

Next, a lubricator 101 that supplies the lubricant to respective portions of the vehicle 1 shall be described.

FIG. 8 is a sectional view of the power unit PU, the second differential gear D2, and the third differential gear D3. In a region farther to the left of a wavy line L1 in FIG. 8, an upper direction on the paper surface corresponds to the upper direction of the vehicle 1 and in a region farther to the right of the wavy line L1 in FIG. 8, the upper direction on the paper surface corresponds to the left direction of the vehicle 1. Arrows in FIG. 8 indicate the flow of the lubricant.

The vehicle 1 includes the lubricator 101 that supplies the lubricant to movable parts, such as the crankshaft 32, etc., that move with respect to the crankcase 36. FIG. 8 shows an example in which the vehicle 1 is provided with the lubricator 101 of a dry sump type. The vehicle 1 may instead include a lubricator of a wet sump type.

The lubricator 101 includes an oil tank 102 that stores the lubricant, supply hoses 103 that guides the lubricant inside the oil tank 102 to the gear cases 81 of the second differential gear D2 and the third differential gear D3, and a feed pump 104 that feeds the lubricant inside the oil tank 102 to the gear cases 81 of the second differential gear D2 and the third differential gear D3 through the supply hoses 103. The lubricator 101 further includes a recovery hose 105 that guides the lubricant inside the crankcase 36 to the oil tank 102, and a scavenge pump 106 that feeds the lubricant inside the crankcase 36 to the oil tank 102 through the recovery hose 105.

The two supply hoses 103 are mounted to the gear cases 81 of the second differential gear D2 and the third differential gear D3. The lubricant guided by one supply hose 103 is supplied into the gear case 81 of the second differential gear D2 through a second supply port 107 opening at an outer surface and an inner surface of the gear case 81 of the second differential gear D2. The lubricant guided by the other supply hose 103 is supplied into the gear case 81 of the third differential gear D3 through a third supply port 108 opening at an outer surface and an inner surface of the gear case 81 of the third differential gear D3. The lubricant is thus supplied to internal spaces (gear chambers GC) of the second differential gear D2 and the third differential gear D3. The gears (input gears 61, etc.) inside the second differential gear D2 and the third differential gear D3 are consequently lubricated and cooled.

The internal space (gear chamber GC) of the second differential gear D2 continues to the internal space (crank chamber CC) of the crankcase 36 through an internal space of the adapter 91, which is a tangible object. Similarly, the internal space (gear chamber GC) of the third differential gear D3 continues to the internal space of the crankcase 36 through an internal space of the adapter 97, which is a tangible object. Therefore, the lubricant inside the second differential gear D2 flows into the crankcase 36 through the adapter 91 and the lubricant inside the third differential gear D3 flows into the crankcase 36 through the adapter 97. Movable members housed inside the crankcase 36, such as the final gear 49, etc., are thus lubricated and cooled.

The lubricant inside the crankcase 36 flows down to a bottom portion 36b of the crankcase 36 due to gravity. The recovery hose 105 is mounted to the bottom portion 36b of the crankcase 36. The recovery hose 105 is connected to a recovery port 109 opening at an outer surface and an inner surface of the crankcase 36. The lubricant inside the crankcase 36 is drained to the recovery hose 105 through the recovery port 109 of the crankcase 36. The lubricant supplied to the gear case 81 and the crankcase 36 is thus recovered to the oil tank 102. The lubricant is thus circulated.

As described above, according to a preferred embodiment of the present invention, the rotation of the engine 21 is transmitted to the three pairs of wheels W1 to W3 through the three differential gears D1 to D3 and the vehicle 1 moves forward or in reverse. The second differential gear D2, which is an example of the front differential gear, is located in front of the engine 21 and is fixed to the engine 21. It is therefore possible to reduce the number of parts of the vehicle 1 and make the second differential gear D2 and the engine 21 compact in the front-rear direction in comparison to a case in which the second differential gear D2 is coupled to the engine 21 through a shaft and a universal joint. Thus, even if three or more pairs of wheels are included, it is possible to reduce a wheelbase (distance in the front-rear direction from a center of a frontmost wheel to a center of a rearmost wheel) and make the vehicle 1 compact in the front-rear direction.

According to a preferred embodiment of the present invention, the second differential gear D2 is close to the engine 21 in the front-rear direction. That is, the distance L1 in the front-rear direction from the rotational axis Ac of the engine 21 to the rotational axis Ar2 of the second differential gear D2 is shorter than the interval L3 in the right-left direction between the pair of first wheels W1. From another standpoint, the interval L3 between the pair of first wheels W1 is widened to achieve the above arrangement. It is possible to make the second differential gear D2 and the engine 21 even more compact in the front-rear direction because the second differential gear D2 is located close to the engine 21. It is also possible to widen a width of the vehicle 1 while reducing or minimizing lengths in the front-rear direction of the second differential gear D2 and the engine 21 because the interval L3 between the pair of first wheels W1 is wide.

According to a preferred embodiment of the present invention, the rotation of the engine 21 is transmitted to the driveshaft 25. Rotation of the driveshaft 25 is transmitted to the input gear 61, which is an example of the front input gear, of the second differential gear D2. The driveshaft 25 and the input gear 61 are aligned in the front-rear direction and are located on the rotational axis Ad extending in the front-rear direction. The driveshaft 25 is coupled to the input gear 61 but not through a universal joint. It is therefore possible to make the second differential gear D2 and the engine 21 compact in the front-rear direction in comparison to a case in which the driveshaft 25 is coupled to the input gear 61 through a universal joint.

According to a preferred embodiment of the present invention, the gear chamber GC of the second differential gear D2 is directly connected to the crank chamber CC of the engine 21. The lubricant flows back and forth between the crank chamber CC of the engine 21 and the gear chamber GC of the second differential gear D2. If the lubricant is not able to flow back and forth between the second differential gear D2 and the engine 21, a temperature and an amount of contamination of the lubricant must be checked at each of the second differential gear D2 and the engine 21. On the other hand, if the lubricant flows between the second differential gear D2 and the engine 21, checking the temperature, etc., of the lubricant at either of the second differential gear D2 and the engine 21 is practically equivalent to checking the temperature, etc., of the lubricant at both the second differential gear D2 and the engine 21. It is therefore possible to check the temperature and the amount of contamination of the lubricant at one time.

Further, if the gear chamber GC of the second differential gear D2 is directly connected to the crank chamber CC of the engine 21, the lubricant is supplied to both the second differential gear D2 and the engine 21 when the lubricant is supplied to either of the second differential gear D2 and the engine 21. Moreover, when the lubricant is drained from either of the second differential gear D2 and the engine 21, the lubricant is drained from both the second differential gear D2 and the engine 21. When manufacturing the vehicle 1, the lubricant is poured into the second differential gear D2 and the engine 21. During maintenance of the vehicle 1, the lubricant inside the second differential gear D2 and the engine 21 is replaced with new lubricant. It is therefore possible to reduce time required to manufacture and maintain the vehicle 1.

According to a preferred embodiment of the present invention, not just the gear chamber GC of the second differential gear D2 but the gear chamber GC of the third differential gear D3 is also directly connected to the crank chamber CC of the engine 21. The lubricant flows back and forth between the crank chamber CC of the engine 21 and the gear chamber GC of the third differential gear D3. It is therefore possible to check the temperature and the amount of contamination of the lubricant at one time and reduce the time required to manufacture and maintain the vehicle 1.

According to a preferred embodiment of the present invention, not just the second differential gear D2 located in front of the engine 21 but the third differential gear D3 located at the rear of the engine 21 is also fixed to the engine 21. It is therefore possible to reduce the number of parts of the vehicle 1 and make the third differential gear D3, which is an example of the rear differential gear, and the engine 21 compact in the front-rear direction in comparison to a case in which the third differential gear D3 is coupled to the engine 21 through a shaft and a universal joint. It is thus possible to reduce a distance in the front-rear direction from a front end of the second differential gear D2 to a rear end of the third differential gear D3 and make the vehicle 1 compact in the front-rear direction.

According to a preferred embodiment of the present invention, the third differential gear D3 is close to the engine 21 in the front-rear direction. That is, the distance L2 in the front-rear direction from the rotational axis Ac of the engine 21 to the rotational axis Ar3 of the third differential gear D3 is shorter than the interval L3 in the right-left direction between the pair of first wheels W1. From another standpoint, the interval L3 between the pair of first wheels W1 is widened to achieve the above arrangement. It is possible to make the third differential gear D3 and the engine 21 even more compact in the front-rear direction because the third differential gear D3 is located close to the engine 21. It is also possible to widen the width of the vehicle 1 while reducing or minimizing lengths in the front-rear direction of the third differential gear D3 and the engine 21 because the interval L3 between the pair of first wheels W1 is wide.

According to a preferred embodiment of the present invention, the third differential gear D3 is located closer to the engine 21 than the second differential gear D2. That is, the distance L2 in the front-rear direction from the rotational axis Ac of the engine 21 to the rotational axis Ar3 of the third differential gear D3 is shorter than the distance L1 in the front-rear direction from the rotational axis Ac of the engine 21 to the rotational axis Ar2 of the second differential gear D2. The third differential gear D3 is thus located even closer to the engine 21 and it is therefore possible to make the third differential gear D3 and the engine 21 even more compact in the front-rear direction and further reduce the wheelbase of the vehicle.

According to a preferred embodiment of the present invention, the rotation of the engine 21 is transmitted to the driveshaft 25. The rotation of the driveshaft 25 is transmitted to the input gear 61, which is an example of the rear input gear, of the third differential gear D3. The driveshaft 25 and the input gear 61 are aligned in the front-rear direction and are located on the rotational axis Ad extending in the front-rear direction. The driveshaft 25 is coupled to the input gear 61 but not through a universal joint. It is therefore possible to make the third differential gear D3 and the engine 21 compact in the front-rear direction in comparison to a case in which the driveshaft 25 is coupled to the input gear 61 through a universal joint.

If the second differential gear D2 is fixed to the engine 21, although the second differential gear D2 and the engine 21 are made compact in the front-rear direction, a weight of a single unit that includes the second differential gear D2 and the engine 21 increases. Therefore, if just the powertrain PT extending from the engine 21 to the three pairs of wheels W1 to W3 is considered, an imbalance in the weight may occur easily. According to a preferred embodiment of the present invention, the front edges 5f of the seat surfaces 5 of the driver seat 3 and the side seat 4 are located farther forward than the front end 36f of the crankcase 36, which corresponds to the front end of the engine 21, and therefore the feet of persons seated on the driver seat 3 and the side seat 4, etc., are also located farther forward than the front end of the engine 21. It is therefore possible to alleviate the imbalance in the weight of the powertrain PT.

The present invention is not restricted to the contents of the preferred embodiments described above, and various modifications are possible.

Figure 9:
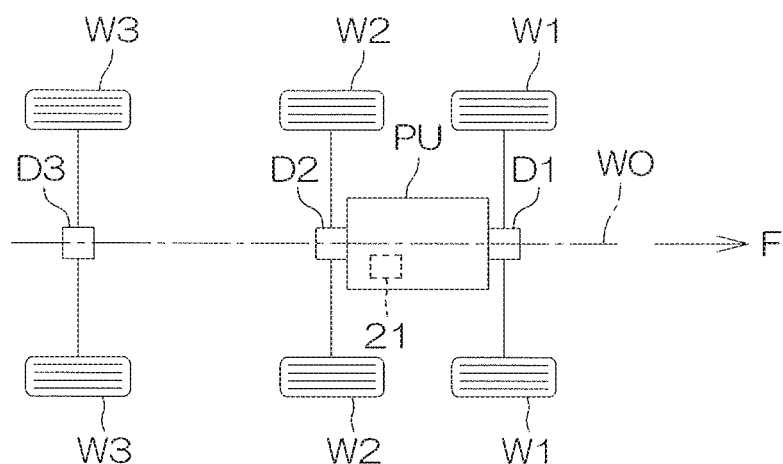
FIG. 9 is a schematic view of a planar layout of a vehicle according to a second preferred embodiment of the present invention.
Figure 10:
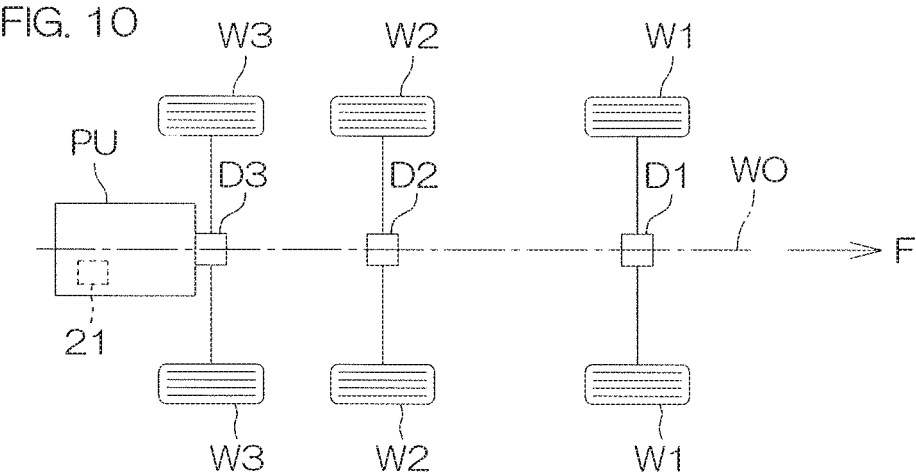
FIG. 10 is a schematic view of a planar layout of a vehicle according to a third preferred embodiment of the present invention.

For example, as shown in FIG. 9, the power unit PU that includes the engine 21 may be located between the first differential gear D1 and the second differential gear D2 and be fixed to the first differential gear D1 and the second differential gear D2. Or, as shown in FIG. 10, the power unit PU may be located at the rear of the third differential gear D3 and be fixed to the third differential gear D3.

Figure 11:
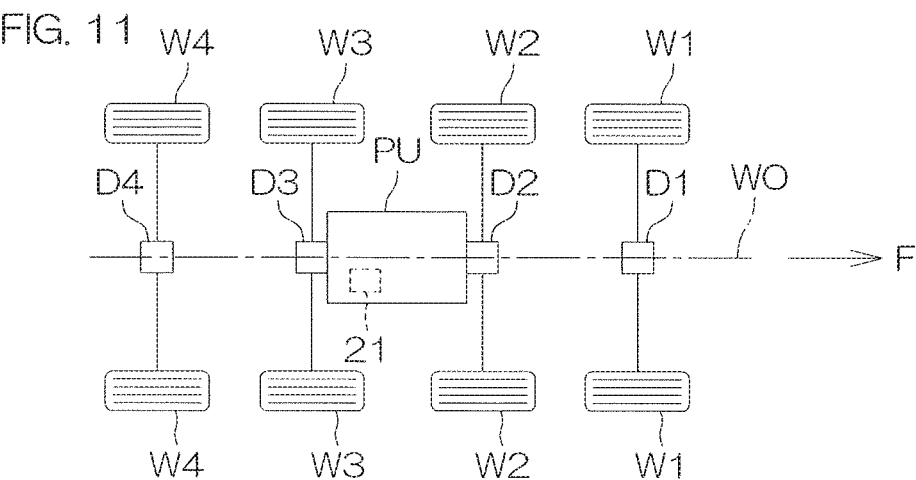
FIG. 11 is a schematic view of a planar layout of a vehicle according to a fourth preferred embodiment of the present invention.

As shown in FIG. 11, the vehicle 1 may include four or more pairs of wheels. FIG. 11 shows an example in which the vehicle 1 is provided with a pair of fourth wheels W4 spaced apart in the right-left direction, and a fourth differential gear D4 located between the pair of fourth wheels W4 in the right-left direction, and the pair of fourth wheels W4 are located at the rear of the pair of third wheels W3. The pair of fourth wheels W4 may be located in front of the pair of first wheels W1 instead of at the rear of the pair of third wheels W3.

Figure 12:
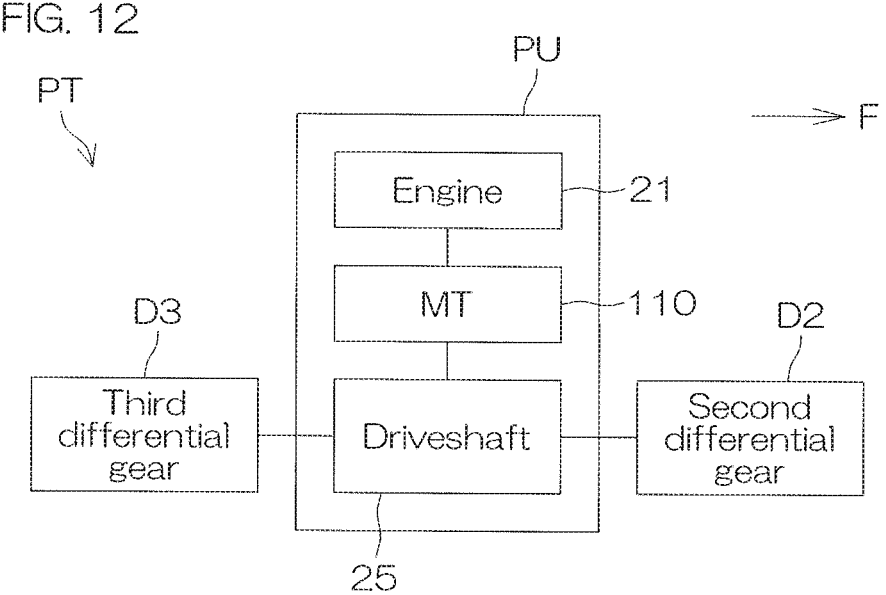
FIG. 12 is a block diagram of a portion of a power train of a vehicle according to a fifth preferred embodiment of the present invention.

As shown in FIG. 12, the vehicle 1 may include a manual transmission 110 in place of the automatic transmission 22. In this case, the rotational axis Ac of the crankshaft 32 may extend in the right-left direction in plan view or may extend in the front-rear direction in plan view. In the latter case, a rotational axis of the downstream drive gear 48 (see FIG. 4) of the speed reducer 24 may be parallel or substantially parallel to the rotational axis Ad of the final gear 49 of the speed reducer 24. The same applies in the case in which the vehicle 1 includes the automatic transmission 22.

Figure 13:
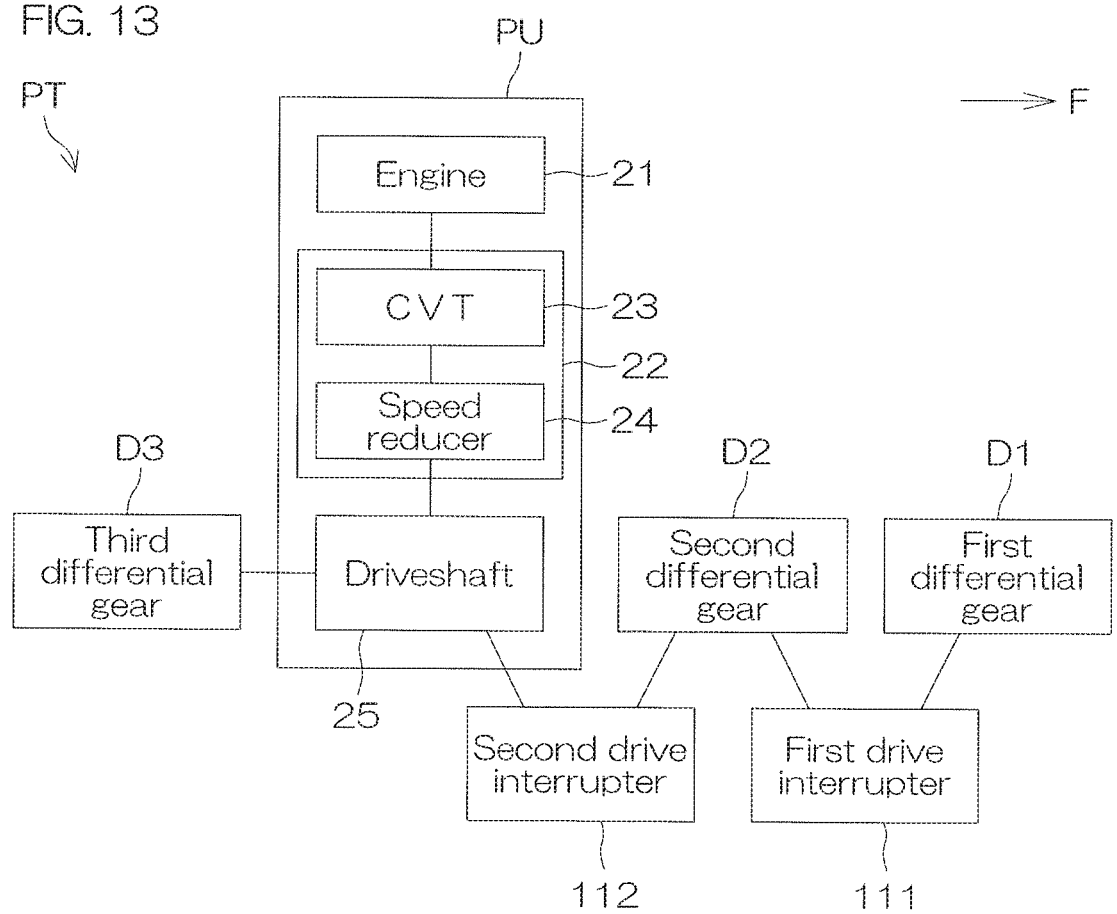
FIG. 13 is a block diagram of a portion of a power train of a vehicle according to a sixth preferred embodiment of the present invention.

As shown in FIG. 13, the vehicle 1 may include drive interrupters that switch the number of driving wheels. FIG. 13 shows an example in which the vehicle 1 includes a first drive interrupter 111 that disconnects and connects the power transmission path between the first differential gear D1 and the second differential gear D2, and a second drive interrupter 112 that disconnects and connects the power transmission path between the second differential gear D2 and the driveshaft 25. The vehicle 1 may include a drive interrupter in place of the front spline joint Sf (see FIG. 4). Similarly, the vehicle 1 may include a drive interrupter in place of the rear spline joint Sr (see FIG. 4).

Each of the first drive interrupter 111 and the second drive interrupter 112 includes a joining device, such as a spline or dog, etc. The first drive interrupter 111 and the second drive interrupter 112 may be of an electric type or a hydraulic type or may be of a manual type. When the second drive interrupter 112 is disconnected, just the pair of third wheels W3 are driven by the engine 21, and the pair of first wheels W1 and the pair of second wheels W2 rotate due to the traveling of the vehicle 1. When the first drive interrupter 111 is disconnected, just the pair of second wheels W2 and the pair of third wheels W3 are driven by the engine 21, and the pair of first wheels W1 rotate due to the traveling of the vehicle 1.

The distance L1 in the front-rear direction from the rotational axis Ac of the engine 21 to the rotational axis Ar2 of the second differential gear D2 may be not less than the interval L3 in the right-left direction between the pair of first wheels W1. Similarly, the distance L2 in the front-rear direction from the rotational axis Ac of the engine 21 to the rotational axis Ar3 of the third differential gear D3 may be not less than the interval L3 in the right-left direction between the pair of first wheels W1. The distance L2 may be not less than the distance L1.

The front driveshaft 51 may be coupled to the input gear 61 of the second differential gear D2 through a universal joint. Or, the front driveshaft 51 may be integral with the input gear 61 of the second differential gear D2.

Similarly, the rear driveshaft 52 may be coupled to the input gear 61 of the third differential gear D3 through a universal joint. Or, the rear driveshaft 52 may be integral with the input gear 61 of the third differential gear D3.

The gear chamber GC of the second differential gear D2 may be separated from the crank chamber CC such that the lubricant is not able to flow back and forth between the gear chamber GC and the crank chamber CC. Similarly, the gear chamber GC of the third differential gear D3 may be separated from the crank chamber CC such that the lubricant is not able to flow back and forth between the gear chamber GC and the crank chamber CC.

The gear case 81 of the third differential gear D3 may be movable with respect to the crankcase 36. That is, if the gear case 81 of the second differential gear D2 is fixed to the crankcase 36, the gear case 81 of the third differential gear D3 may be movable with respect to the crankcase 36.

The front edge 5f of the seat surface 5 of the driver seat 3 may be located farther rearward than the front end 36f of the crankcase 36. In this case, the driver seat 3 may be moved rearward or the engine 21 may be moved forward or both the driver seat 3 and the engine 21 may be moved in the front-rear direction.

The vehicle 1 may be an unmanned vehicle that is driven remotely instead of a manned vehicle that is driven by the driver on the vehicle 1. In this case, all seats, including the driver seat 3, may be omitted.

Features of two or more of the various preferred embodiments described above may be combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a pair of first wheels spaced apart in a right-left direction;
   a pair of second wheels spaced apart in the right-left direction and positioned rearward of the pair of first wheels;
   a pair of third wheels spaced apart in the right-left direction and positioned rearward of the pair of second wheels;
   a first differential gear located between the pair of first wheels in the right-left direction;
   a second differential gear located between the pair of second wheels in the right-left direction;
   a third differential gear located between the pair of third wheels in the right-left direction; and
   a prime mover located rearward of a front differential gear, which corresponds to any one of the first differential gear, the second differential gear, and the third differential gear, and which is fixed to the front differential gear, the prime mover generating a rotation to be transmitted through the first differential gear, the second differential gear, and the third differential gear to the pair of first wheels, the pair of second wheels, and the pair of third wheels.

2. The vehicle according to claim 1, wherein a distance in a front-rear direction from a rotational axis of the prime mover to a rotational axis of the front differential gear is shorter than a distance in the right-left direction between the pair of first wheels.

3. The vehicle according to claim 1, further comprising:
   a driveshaft that transmits the rotation transmitted from the prime mover toward the first differential gear, the second differential gear, and the third differential gear; wherein
   the front differential gear includes a front input gear rotatable around a rotational axis extending in a front-rear direction; and
   the driveshaft is located on the rotational axis of the front input gear and is coupled to the front input gear but not through a universal joint.

4. The vehicle according to claim 1, wherein the prime mover is fixed to the front differential gear such that a lubricant flows between an internal space of the prime mover and an internal space of the front differential gear.

5. The vehicle according to claim 1, wherein
   the prime mover includes a piston that reciprocates due to combustion of a fuel, a crankshaft that rotates in accordance with the reciprocation of the piston, a connecting rod that connects the piston and the crankshaft, and a crankcase that houses the crankshaft; and
   the front differential gear is fixed to the crankcase.

6. The vehicle according to claim 1, wherein
   the front differential gear includes a front gear case that houses a plurality of gears; and
   the prime mover includes a prime mover case that is different from the front gear case and is fixed to the front gear case.

7. The vehicle according to claim 1, wherein
the front differential gear includes a front gear case that houses a plurality of gears; and
the prime mover includes a prime mover case that is integral with the front gear case.

8. The vehicle according to claim 1, wherein
the prime mover is located forward of a rear differential gear, which corresponds to any one of the first differential gear, the second differential gear, and the third differential gear, and that is different from the front differential gear; and
the prime mover is fixed to the rear differential gear.

9. The vehicle according to claim 8, wherein a distance in a front-rear direction from a rotational axis of the prime mover to a rotational axis of the rear differential gear is shorter than a distance in the right-left direction between the pair of first wheels.

10. The vehicle according to claim 8, wherein a distance in a front-rear direction from a rotational axis of the prime mover to a rotational axis of the rear differential gear is shorter than a distance in the front-rear direction from the rotational axis of the prime mover to a rotational axis of the front differential gear.

11. The vehicle according to claim 8, further comprising:
a driveshaft that transmits the rotation transmitted from the prime mover toward the first differential gear, the second differential gear, and the third differential gear; wherein
the rear differential gear includes a rear input gear rotatable around a rotational axis extending in the front-rear direction; and
the driveshaft is located on the rotational axis of the rear input gear and is coupled to the rear input gear but not through a universal joint.

12. The vehicle according to claim 8, wherein the prime mover is fixed to the rear differential gear such that a lubricant flows between an internal space of the prime mover and an internal space of the rear differential gear.

13. The vehicle according to claim 8, wherein
the rear differential gear includes a rear gear case that houses a plurality of gears; and
the prime mover includes a prime mover case that is different from the rear gear case and is fixed to the rear gear case.

14. The vehicle according to claim 8, wherein
the rear differential gear includes a rear gear case that houses a plurality of gears; and
the prime mover includes a prime mover case that is integral with the rear gear case.

15. The vehicle according to claim 1, further comprising:
a transmission that is fixed to the prime mover and transmits the rotation transmitted from the prime mover toward the first differential gear, the second differential gear, and the third differential gear and that changes a speed of the rotation.

16. The vehicle according to claim 1, further comprising a seat that includes a front edge located forward of a front end of the engine.

* * * * *